United States Patent
Zhang et al.

(10) Patent No.: US 12,405,480 B2
(45) Date of Patent: Sep. 2, 2025

(54) LENS UNIT, OPTICAL LENS, ILLUMINATION MODULE, VEHICLE LIGHT, AND VEHICLE

(71) Applicant: HASCO VISION TECHNOLOGY CO., LTD., Shanghai (CN)

(72) Inventors: Jie Zhang, Shanghai (CN); Jiayuan Chen, Shanghai (CN); Hao Zhou, Shanghai (CN); Shikun Dong, Shanghai (CN); He Zhu, Shanghai (CN); Wenhui Sang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/922,143

(22) PCT Filed: Apr. 23, 2021

(86) PCT No.: PCT/CN2021/089377
§ 371 (c)(1),
(2) Date: Oct. 28, 2022

(87) PCT Pub. No.: WO2021/218826
PCT Pub. Date: Nov. 4, 2021

(65) Prior Publication Data
US 2023/0213777 A1      Jul. 6, 2023

(30) Foreign Application Priority Data

Apr. 30, 2020    (CN) .................. 202010367179.X
Dec. 29, 2020    (CN) .................. 202011589522.1
(Continued)

(51) Int. Cl.
*G02B 27/09*    (2006.01)
*F21S 41/147*    (2018.01)
(Continued)

(52) U.S. Cl.
CPC ......... *G02B 27/0977* (2013.01); *G02B 27/30* (2013.01); *F21S 41/147* (2018.01);
(Continued)

(58) Field of Classification Search
CPC .......... F21V 5/005; F21V 5/007; F21V 5/045; F21V 5/08; F21V 7/0083; F21V 7/06;
(Continued)

(56) References Cited

U.S. PATENT DOCUMENTS 7,097,334 B2 *   8/2006   Ishida ................... F21S 41/155
                                                    362/555
2003/0198060 A1 * 10/2003  Ishida ................... F21S 41/338
                                                    362/545
(Continued)

FOREIGN PATENT DOCUMENTS

CN    2862070    1/2007
CN    108397750  8/2018
(Continued)

OTHER PUBLICATIONS

Machine translation of CN 110296372 A retrieved from the FIT database of PE2E search. (Year: 2023).*
(Continued)

*Primary Examiner* — Colin J Cattanach
(74) *Attorney, Agent, or Firm* — Casimir Jones, S.C.; Robert A. Goetz

(57) ABSTRACT

Disclosed are a lens unit, an optical lens, an illumination module, a vehicle light, and a vehicle. The lens unit comprises a light incident portion (1) having first unidirectional collimation and a light emergent portion (2) having second unidirectional collimation, so as to form an asymmetric light shape. The lens unit can meet the requirement of the anisotropy of the illumination light shape of the vehicle light
(Continued)

so as to form the asymmetric light shape, thereby meeting the requirement for a narrow and long model.

14 Claims, 16 Drawing Sheets

(30) Foreign Application Priority Data

| | | |
|---|---|---|
| Dec. 29, 2020 | (CN) | 202011592501.5 |
| Dec. 29, 2020 | (CN) | 202023252420.9 |
| Dec. 29, 2020 | (CN) | 202023252577.1 |

(51) Int. Cl.

| | |
|---|---|
| *F21S 41/148* | (2018.01) |
| *F21S 41/151* | (2018.01) |
| *F21S 41/153* | (2018.01) |
| *F21S 41/20* | (2018.01) |
| *F21S 41/24* | (2018.01) |
| *F21S 41/26* | (2018.01) |
| *F21S 41/265* | (2018.01) |
| *F21S 41/27* | (2018.01) |
| *F21S 41/275* | (2018.01) |
| *F21S 41/32* | (2018.01) |
| *F21S 41/33* | (2018.01) |
| *F21S 41/365* | (2018.01) |
| *F21V 5/00* | (2018.01) |
| *F21V 5/04* | (2006.01) |
| *F21V 5/08* | (2006.01) |
| *F21V 7/00* | (2006.01) |
| *F21V 7/06* | (2006.01) |
| *G02B 27/30* | (2006.01) |

(52) U.S. Cl.
CPC ........... *F21S 41/148* (2018.01); *F21S 41/151* (2018.01); *F21S 41/153* (2018.01); *F21S 41/24* (2018.01); *F21S 41/26* (2018.01); *F21S 41/265* (2018.01); *F21S 41/27* (2018.01); *F21S 41/275* (2018.01); *F21S 41/285* (2018.01); *F21S 41/322* (2018.01); *F21S 41/335* (2018.01); *F21S 41/337* (2018.01); *F21S 41/365* (2018.01); *F21V 5/005* (2013.01); *F21V 5/007* (2013.01); *F21V 5/045* (2013.01); *F21V 5/08* (2013.01); *F21V 7/0083* (2013.01); *F21V 7/06* (2013.01)

(58) Field of Classification Search
CPC ...... F21S 41/147; F21S 41/148; F21S 41/151; F21S 41/153; F21S 41/24; F21S 41/26; F21S 41/265; F21S 41/27; F21S 41/285; F21S 41/25–275; F21S 41/322; F21S 41/33–36
See application file for complete search history.

(56) References Cited

U.S. PATENT DOCUMENTS

| | | | | |
|---|---|---|---|---|
| 2003/0214815 A1* | 11/2003 | Ishida | .................. | F21S 41/151 |
| | | | | 362/516 |
| 2005/0219856 A1* | 10/2005 | Tatsukawa | ............ | F21S 41/323 |
| | | | | 362/538 |
| 2007/0183164 A1* | 8/2007 | Naganawa | ............ | F21S 41/155 |
| | | | | 362/545 |
| 2009/0097268 A1* | 4/2009 | Mochizuki | ............ | F21S 41/365 |
| | | | | 362/538 |
| 2012/0243250 A1* | 9/2012 | Yagi | ...................... | F21S 41/143 |
| | | | | 362/520 |
| 2013/0188377 A1 | 7/2013 | Konishi | | |
| 2014/0321147 A1* | 10/2014 | Todaka | .................. | F21S 41/336 |
| | | | | 362/245 |
| 2016/0033689 A1* | 2/2016 | Streppel | .................. | F21V 5/045 |
| | | | | 359/743 |
| 2020/0041093 A1 | 2/2020 | Pellarin et al. | | |
| 2021/0332964 A1* | 10/2021 | Giraud | .................... | F21S 43/31 |
| 2024/0027050 A1* | 1/2024 | Gromfeld | ............... | F21S 41/24 |

FOREIGN PATENT DOCUMENTS

| | | | | |
|---|---|---|---|---|
| CN | 108474534 A | | 8/2018 | |
| CN | 109681843 | | 4/2019 | |
| CN | 209086575 | | 7/2019 | |
| CN | 209399286 | | 9/2019 | |
| CN | 110296372 A | * | 10/2019 | ............. F21S 41/24 |
| CN | 110554508 | | 12/2019 | |
| CN | 110716377 | | 1/2020 | |
| CN | 210891433 U | | 6/2020 | |
| CN | 211316063 U | | 8/2020 | |
| CN | 211780825 U | | 10/2020 | |
| JP | 2008-181717 | | 8/2008 | |
| JP | 2009-238470 | | 10/2009 | |
| JP | 2017-138471 | | 8/2017 | |
| JP | 2019-186025 | | 10/2019 | |
| KR | 20170079415 A | | 7/2017 | |
| KR | 20180103962 A | | 9/2018 | |
| WO | WO-9950596 A2 | * | 10/1999 | ............. F21V 5/007 |
| WO | 2018/192963 | | 10/2018 | |
| WO | 2019/177050 | | 9/2019 | |

OTHER PUBLICATIONS

Machine translation of CN 209086575 U retrieved from the FIT database of PE2E search. (Year: 2023).*
International Search Report, International Patent Application No. PCT/CN2021/089377, mailed Jul. 21, 2021, 3 pages.
English translation of Written Opinion, International Patent Application No. PCT/CN2021/089377, dated Jul. 21, 2021, 3 pages.
Office Action, EP Patent Application No. 21797143.1, dated Sep. 19, 2023, 6 pages.
Extended EP Search Report, EP Patent Application No. 21797143.1, dated Sep. 5, 2023, 3 pages.
Decision to Grant, JP Patent Application No. 2022-561004, dated Apr. 18, 2024, 2 pages.
Office Action, JP Patent Application No. 2022-561004, dated Nov. 13, 2023, 8 pages.
Office Action, CN Patent Application No. 2020232524209, dated Oct. 10, 2024, 7 pages.

* cited by examiner

LENS UNIT, OPTICAL LENS, ILLUMINATION MODULE, VEHICLE LIGHT, AND VEHICLE

CROSS-REFERENCE TO RELATED APPLICATIONS

The present disclosure claims the benefit to the Chinese patent application 202010367179.X filed on Apr. 30, 2020, the Chinese patent application 202011589522.1 filed on Dec. 29, 2020, the Chinese patent application 202011592501.5 filed on Dec. 29, 2020, the Chinese patent application 202023252577.1 filed on Dec. 29, 2020, the Chinese patent application 202023252420.9 filed on Dec. 29, 2020, the contents of the above applications are incorporated herein by reference.

TECHNICAL FIELD

The present disclosure relates to a vehicle optical component, in particular to a lens unit. In addition, the present disclosure also relates to an optical lens having the above lens unit, an illumination module having the above optical lens, a vehicle light having the above illumination module, and a vehicle having the above vehicle light.

BACKGROUND ART

The vehicle light refers to a lamp on a vehicle. It is a lighting tool for the vehicle to travel on the road at night, and is also a prompt tool for sending various vehicle travel signals. It has a quite important effect in ensuring the safe driving of the vehicle. With the development of social economy, the automobile industry is also developed, and with the continuous development of lighting technology of automobiles, more requirements are imposed on the functions of the vehicle light.

In an illumination module for realizing the lighting function of the vehicle light, a collimating optical element is usually provided so as to obtain approximately parallel emergent light, for example, a hyperboloid collimating lens, on which a curved surface is a rotating curved surface based on an optical axis of the lens, and of which the imaging is characterized by isotropy.

However, a light pattern of lighting of the vehicle light is required to be anisotropic, for example, a small up-down lighting angle and a large left-right lighting angle; to this end, a vehicle light illumination system based on the above collimating lens, for example, a spherical lens, needs to form a basic light pattern with a certain width by specially designing an additional optical system, then, the basic light pattern is imaged to a road surface through the collimating lens. Such a vehicle light illumination system is relatively complex in structure, and in the light distribution process, the additional optical system and surface types of a plurality of optical surfaces such as a light incident surface and a light emergent surface of the lens need to be taken into account, then the light distribution process is complex and tedious.

Therefore, a novel lens unit needs to be designed to be capable of overcoming or alleviating the above technical problems.

SUMMARY

In a first aspect, the technical problem to be solved by the present disclosure is to provide a lens unit, wherein the lens unit can meet the requirement of anisotropic light pattern of lighting of the vehicle light, form an asymmetric light pattern, and satisfy the requirement for a narrow and long shape (profile).

In a second aspect, the technical problem to be solved by the present disclosure is to provide an optical lens, wherein a light emergent surface of the optical lens has a relatively small dimension in an up-down direction, can satisfy the requirement for a narrow and long shape, and has relatively high optical efficiency.

In a third aspect, the technical problem to be solved by the present disclosure is to provide an illumination module, wherein the illumination module has an optical lens with a relatively small dimension in an up-down direction, can satisfy the requirements for a light pattern of a vehicle light and a narrow and long shape of appearance of the vehicle light, and has a simplified structure, a high level of integration, and high optical efficiency.

In a fourth aspect, the technical problem to be solved by the present disclosure is to provide a vehicle light, which vehicle light has the appearance in a narrow and long shape.

In a fifth aspect, the technical problem to be solved by the present disclosure is to provide a vehicle, wherein a vehicle light of the vehicle has a narrow and long shape.

In order to solve the above technical problems, in the first aspect, the present disclosure provides a lens unit, including a light incident portion collimating light in a first single direction and a light emergent portion collimating light in a second single direction, so as to be capable of forming an asymmetric light pattern.

Preferably, the asymmetric light pattern is a rectangular light pattern.

Preferably, the light incident portion is a curved surface formed by stretching a section line thereof in a first direction along a section line thereof in a direction perpendicular to the first direction, and the light emergent portion is a curved surface formed by stretching a section line thereof in a second direction along a section line thereof in a direction perpendicular to the second direction.

Optionally, both the light incident portion and the light emergent portion are columnar surfaces or quasi-columnar surfaces.

Optionally, both the light incident portion and the light emergent portion are cylindrical surfaces.

Optionally, both the light incident portion and the light emergent portion are stepped Fresnel columnar surfaces.

Optionally, one of the light incident portion and the light emergent portion is a columnar surface, and the other is a stepped Fresnel columnar surface.

Specifically, one of a light collimating direction of the light incident portion and a light collimating direction of the light emergent portion is a vertical direction, and the other is a horizontal direction.

Further, a reflection portion is also included, and the reflection portion is arranged in a manner of being capable of reflecting light incident from the light incident portion to the light emergent portion.

Specifically, the light incident portion, the reflection portion, and the light emergent portion are connected in sequence to form a bending structure.

In the second aspect, the present disclosure provide an optical lens, including a plurality of lens units according to any one of the above technical solution, wherein the lens units are arranged along a left-right direction, and the light emergent portions are connected to form a light emergent surface.

Optionally, an III region forming structure is provided or integrally formed on at least one of the light incident portions.

Specifically, the III region forming structure is a groove, and a plurality of strip-shaped protrusions and/or strip-shaped depressions extending along a width direction of the groove are sequentially provided or integrally formed in the groove along a length direction thereof.

In the third aspect, the present disclosure provides an illumination module, including the optical lens according to any one of the above technical solutions and a plurality of light sources, wherein the light sources are arranged corresponding to the light incident portions, so that light emitted from the light sources can enter the optical lens through the corresponding light incident portions.

Optionally, a plurality of primary optical elements in one-to-one correspondence with the light sources are further included, and the primary optical elements are arranged in a manner of being capable of converging and projecting light emitted by the light sources to the corresponding light incident portions, and directing the same into the optical lens.

Specifically, the primary optical elements are reflecting mirrors.

Optionally, the reflecting mirror is a parabolic reflecting mirror or a quasi-parabolic reflecting mirror, and a boundary of the reflecting mirror on a side close to the corresponding light source is provided with a low-beam cut-off structure.

Further, the low-beam cut-off structure includes a main low-beam cut-off line structure and an auxiliary low-beam cut-off line structure, and a boundary of the plurality of reflecting mirrors on one side close to the corresponding light source is provided with the main low-beam cut-off line structure and/or the auxiliary low-beam cut-off line structure.

Optionally, the main low-beam cut-off line structure is a bending line segment formed by connecting straight line segments and/or curved line segments having a segment difference (i.e., step), and the auxiliary low-beam cut-off line structure is a straight line segment or a curved line segment.

Further, the light incident portion includes a main low-beam light incident portion corresponding to the main low-beam cut-off line structure and an auxiliary low-beam light incident portion corresponding to the auxiliary low-beam cut-off line structure.

Specifically, an included angle between a section line of the main low-beam light incident portion in a direction perpendicular to the first direction and a section line of the auxiliary low-beam light incident portion in the direction perpendicular to the first direction is 0.2°~1°.

Optionally, the light incident portions respectively provided corresponding to the plurality of reflecting mirrors.

Optionally, the light source is located in a focal region of the corresponding primary optical element.

Specifically, a distance between a light-emitting center of the light source and a focal point of the corresponding primary optical element is less than or equal to 2 mm.

In a fourth aspect, the present disclosure provides a vehicle light, including the illumination module according to any one of the above technical solutions and a circuit board, and the light source is installed on the circuit board.

Preferably, the circuit board includes an installation surface configured to install the light source, and an included angle between the installation surface and a horizontal direction is greater than or equal to 5°.

In a fifth aspect, the present disclosure provides a vehicle, including the vehicle light according to any one of the above technical solutions.

Through the above technical solutions, the present disclosure has the following beneficial effects:

the light incident portion of the lens unit of the present disclosure can collimate in the first single direction and the light emergent portion of the lens unit can collimate in the second single direction, then on the premise of satisfying the requirements in terms of light pattern, optical performance, optical efficiency etc., the up-down dimension of the light emergent portion of the lens unit is reduced; specifically, the light incident portion collimating in the first single direction means that, in the first-direction section, the section line of the light incident portion in the first direction is a convex curve, which has a converging effect, deflects the light to a greater degree, and can have a certain collimating effect on divergent light, and in the vertical-direction section perpendicular to the first direction, the section line of the light incident portion in this direction is a straight line or almost a straight line, so that deflecting ability of the light incident portion to the divergent light is much inferior to that of the light incident portion to the divergent light in the first-direction section, without a collimating effect, and the light incident portion has the collimating effect on the divergent light in a single direction within a range of position of the first-direction section, that is, the light incident portion deflects the light mainly in the first direction. The light emergent portion collimating light in the second single direction means that, in the second-direction section, a section line of the light emergent portion in the second direction is a convex curve, which has a converging effect, deflects the light to a greater degree, and can have a certain collimating effect on divergent light, and in the vertical-direction section perpendicular to the second direction, the section line of the light emergent portion in this direction is a straight line or almost a straight line, so that deflecting ability of the light emergent portion to the divergent light is much inferior to that of the light emergent portion to the divergent light in the second-direction section, without a collimating effect, and the light emergent portion has the collimating effect in a single direction on the light within a range of position of the second-direction section, that is, the light emergent portion deflects the light mainly in the second direction, and can expand emitted light in the second direction, to satisfy the requirements in terms of light pattern, optical performance, etc. Such structural design enables an imaging magnification power of the light incident portion to the light source in the first direction to be greater than an imaging magnification power of the light emergent portion to the light source in the second direction, so that the light source can form a rectangular light pattern of lighting by means of this lens unit, and the light emergent portion of the lens unit is allowed to have a dimension less than or equal to 20 mm in the up-down direction, so as to satisfy the requirements for the vehicle light in a narrow and long shape. Compared with the common spherical lens in the prior art, by using the lens unit of the present disclosure, surface types of two optical surfaces of the light incident portion and the light emergent portion can be adjusted independently, which greatly simplifies dimming steps in the light distribution process, and on the premise of ensuring the same light effect, effectively reduces the up-down dimension of the light emergent portion of the lens unit.

Moreover, the light incident portion, the reflection portion, and the light emergent portion are connected in sequence to form a bending structure, which can reduce the dimension of the lens unit in the front-rear direction, thus reducing the overall dimension of the lens unit, facilitating the miniaturization design, and having a high level of integration.

Further, the III region forming structure is provided on the light incident portion, thus avoiding interference between the III region forming structure and other parts and improving the flexibility of arrangement of parts inside the vehicle light and optical stability.

Besides, the low-beam cut-off structure is provided on the boundary of the reflecting mirror on a side close to the light source, which can omit the existing shading plate structure; and on the whole, the illumination module of the present disclosure has a compact structure, a high level of integration, fewer parts, and a simplified structure.

Other features and advantages of the present disclosure will be described in detail in the following part of embodiments.

BRIEF DESCRIPTION OF DRAWINGS

The accompanying drawings constituting a part of the present disclosure are used to provide further understanding to the present disclosure, and the exemplary embodiments of the present disclosure and the description thereof are used to explain the present disclosure and do not constitute an improper limitation to the present disclosure. In the accompanying drawings.

ILLUSTRATION OF REFERENCE SIGNS 1 light incident portion; 11 main low-beam light incident portion; 12 auxiliary low-beam light incident portion; 2 light emergent portion; 4 light emergent surface; 3 reflection portion; 30 reflection surface; 5 III region forming structure; 6 light source; 7 primary optical element; 71 main low-beam cut-off line structure; 72 auxiliary low-beam cut-off line structure; 8 circuit board; 9 heat sink.

DETAILED DESCRIPTION OF EMBODIMENTS

The embodiments of the present disclosure are described in detail below with reference to accompanying drawings. It should be understood that the embodiments described herein are merely used to illustrate and explain the present disclosure, rather than being intended to limit the present disclosure.

In the description of the present disclosure, it needs to be noted that unless otherwise specified and defined explicitly, terms "install (mount)", "provide", and "connect" should be construed in a broad sense. For example, it may be a fixed connection, a detachable connection, or an integrated connection; it may be a direct connection, an indirect connection through an intermediary, or inner communication between two elements or interaction between two elements. For a person ordinarily skilled in the art, specific meanings of the above terms in the present disclosure could be understood according to specific circumstances.

Figure 28:
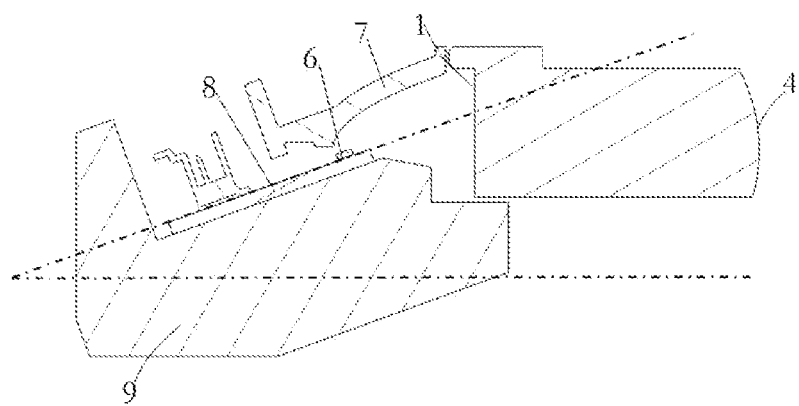
FIG. 28 is a sectional view in a B-B direction in FIG. 27.

It should be understood that, in order to facilitate the description of the present disclosure and simplify the description, terms "front" and "rear" refer to a front-rear direction of a lens unit along a light emergent direction (for example, a light incident portion 1 is located in the rear, and correspondingly, a light emergent portion 2 is located in the front), and is usually substantially the same as a front-rear direction of a vehicle; terms "left" and "right" refer to a left-right direction of the lens unit itself, and is usually substantially the same as a left-right direction of the vehicle; terms "up" and "down" refer to an up-down direction of the lens unit itself, and is usually substantially the same as an up-down direction of the vehicle; for example, referring to FIG. 28, a primary optical element 7 is located above, correspondingly, a heat sink 9 is located below. The terms are based on orientation or positional relationships shown in the accompanying drawings, rather than indicating or implying that related devices or elements have to be in the specific orientation or configured and operated in a specific orientation, therefore, they should not be construed as limitation to the present disclosure; moreover, orientation terms for the lens unit of the present disclosure should be understood with reference to actual installation state.

As shown in FIG. 1, FIG. 4, FIG. 5, FIG. 10, FIG. 12 to FIG. 14, and FIG. 44, a lens unit in a basic embodiment of the present disclosure includes a light incident portion 1 collimating light in a first single direction and a light emergent portion 2 collimating light in a second single direction, so as to be capable of forming an asymmetric light pattern.

Figure 2:
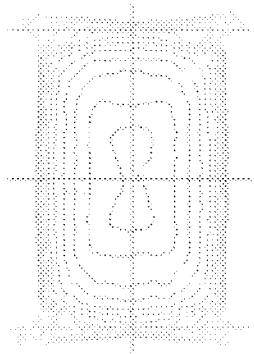
FIG. 2 is a screen illuminance diagram of a light pattern formed by the lens unit in an embodiment of the present disclosure.
Figure 3:
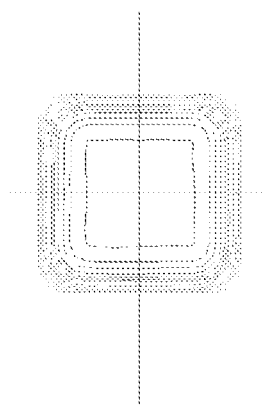
FIG. 3 is a screen illuminance diagram of a light pattern when an existing lens images a square light-emitting surface.

In the above, the light incident portion 1 collimating light in a first single direction means that, in a first-direction section, a section line of the light incident portion 1 in the first direction is a convex curve, which has a converging effect, deflects the light to a greater degree, and can have a certain collimating effect on divergent light, and in a vertical-direction section perpendicular to the first direction, a section line of the light incident portion 1 in this direction is a straight line or almost a straight line, so that deflecting ability of the light incident portion 1 to the divergent light is much inferior to that of the light incident portion 1 to the divergent light in the first-direction section, without a collimating effect, and the light incident portion 1 has the collimating effect on the divergent light in a single direction within a range of position of the first-direction section, that is, the light incident portion 1 deflects the light mainly in the first direction. The light emergent portion 2 collimating light in a second single direction means that, in a second-direction section, a section line of the light emergent portion 2 in the second direction is a convex curve, which has a converging effect, deflects the light to a greater degree, and can have a certain collimating effect on divergent light, and in a vertical-direction section perpendicular to the second direction, a section line of the light emergent portion 2 in this direction is a straight line or almost a straight line, so that deflecting ability of the light emergent portion 2 to the divergent light is much inferior to that of the light emergent portion to the divergent light in the second-direction section, without a collimating effect, and the light emergent portion 2 has the collimating effect in a single direction on the light within a range of position of the second-direction section, that is, the light emergent portion 2 deflects the light mainly in the second direction, and can expand emitted light in the second direction, to satisfy the requirements in terms of light pattern, optical performance, etc. Such structural design enables an imaging magnification power of the light incident portion 1 to the light source in the first direction to be greater than an imaging magnification power of the light emergent portion 2 to the light source in the second direction, so that the light source can form an asymmetric light pattern by means of this lens unit, and the light emergent portion of the lens unit is allowed to have a dimension less than or equal to 20 mm in the up-down direction, so as to satisfy the requirements for the vehicle light in a narrow and long shape. The "asymmetric light pattern" herein mainly means that the dimensions of length and width of the light pattern are quite different, for example, a rectangular light pattern. Compared with the common spherical lens in the prior art, due to its isotropic imaging characteristic, a square light pattern as shown in FIG. 3 is formed. However, the lens unit of the present disclosure, due to its structural characteristics, is allowed to have an anisotropic imaging characteristic, and can form a rectangular light pattern as shown in FIG. 2, with quite obvious asymmetry; moreover, surface types of two optical surfaces of the light incident portion 1 and the light emergent portion 2 can be adjusted independently, which simplifies dimming steps in the light distribution process. On the premise of ensuring the same light effect, the up-down dimension of the light emergent portion of the lens unit can be smaller.

Figure 1:
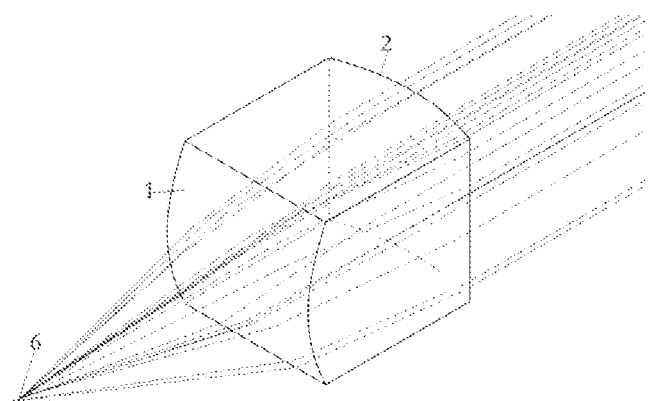
FIG. 1 is a schematic view of a stereoscopic light path of a lens unit in a first embodiment of the present disclosure.
Figure 4:
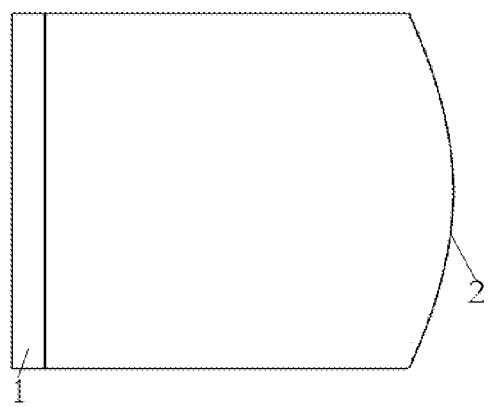
FIG. 4 is a top view of the lens unit in FIG. 1.
Figure 5:
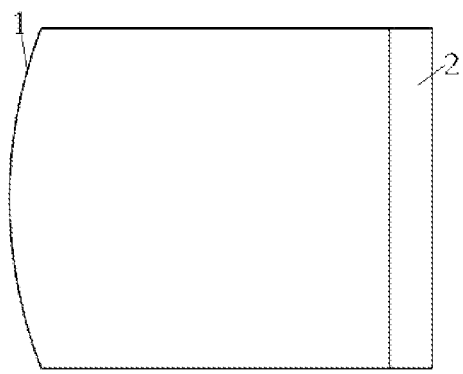
FIG. 5 is a front view of the lens unit in FIG. 1.

In an embodiment, with reference to FIG. 1, FIG. 4, and FIG. 5, the light incident portion 1 and the light emergent portion 2 of the lens unit are arranged along the front-rear direction; in this case, a light collimating direction of the light incident portion 1 is defined in a horizontal direction or a vertical direction, and correspondingly, a light collimating direction of the light emergent portion 2 is defined in the vertical direction or the horizontal direction. In order to facilitate understanding the technical concept of the present disclosure and simplify the description, the lens unit of the present disclosure is described below mainly by taking the case that the light collimating direction of the light incident portion 1 is defined in the horizontal direction and the light collimating direction of the light emergent portion 2 is defined in the vertical direction as an example.

Figure 6:
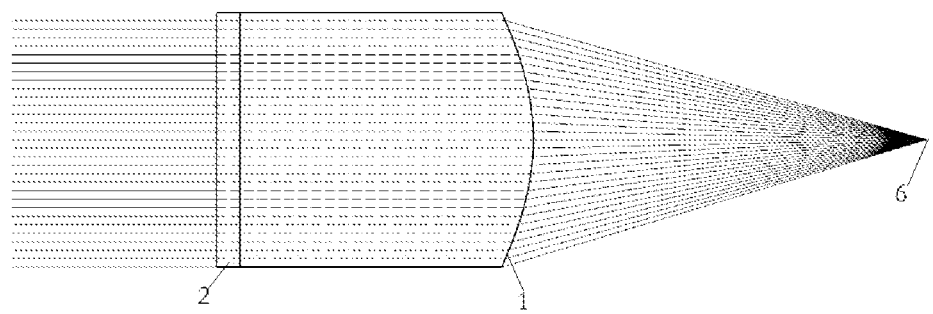
FIG. 6 is a first light path schematic view of a lens unit in a second embodiment of the present disclosure.
Figure 7:
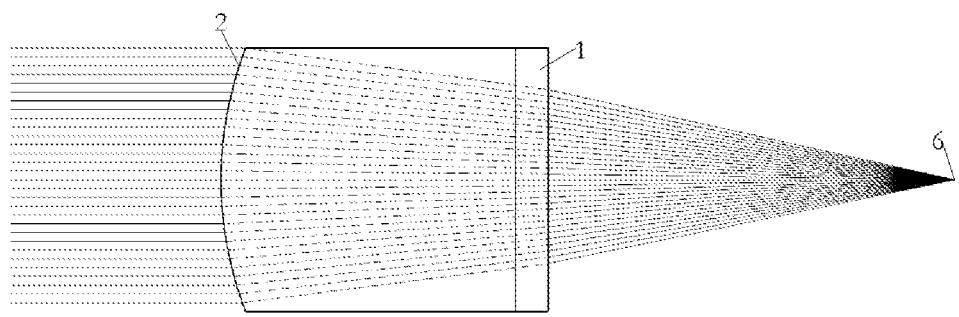
FIG. 7 is a second light path schematic view of the lens unit in the second embodiment of the present disclosure.
Figure 8:
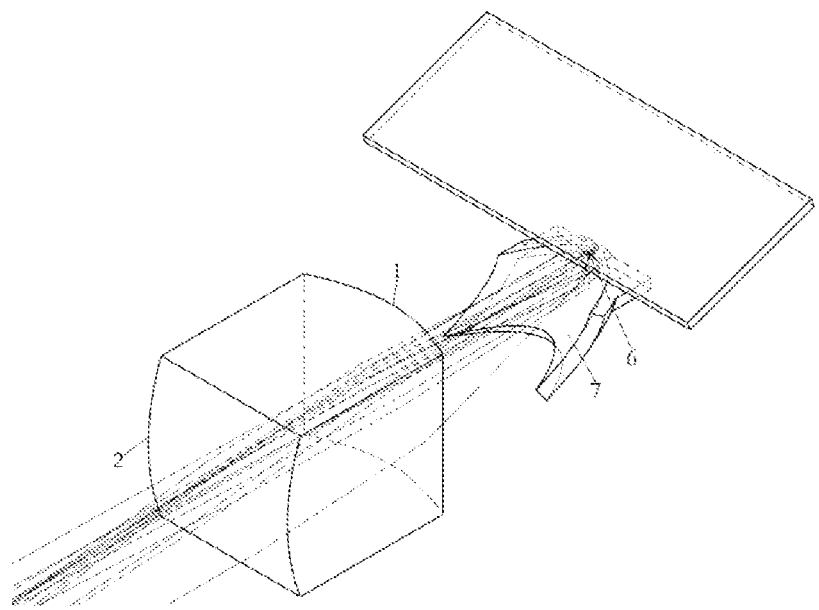
FIG. 8 is a schematic view of a stereoscopic light path of an illumination module in a third embodiment of the present disclosure, wherein the lens unit is the lens unit in the first embodiment.

In the above, with reference to FIG. 6, in a section in the horizontal direction, a section line of the light incident portion 1 in the horizontal direction is a convex curve, which has a converging effect, deflects the light to a greater degree, and can have a certain collimating effect on divergent light. With reference to FIG. 7, in a vertical-direction section, a section line of the light incident portion 1 in the vertical direction is a straight line or almost a straight line, so that deflecting ability of the light incident portion 1 to the divergent light is much inferior to that of the light incident portion 1 to the divergent light in the horizontal-direction section, without a collimating effect. The light incident portion 1 deflects the light mainly in the horizontal direction. By the same reasoning, with reference to FIG. 7, in a vertical-direction section, a section line of the light emergent portion 2 in the vertical direction is a convex curve, which has a converging effect, deflects the light to a greater degree, and can have a certain collimating effect on divergent light. In a horizontal-direction section, a section line of the light emergent portion 2 in the horizontal direction is a straight line or almost a straight line, so that deflecting ability of the light emergent portion 2 to the divergent light is much inferior to that of the light emergent portion to the divergent light in the vertical-direction section, without a collimating effect. The light emergent portion 2 deflects the light mainly in the vertical direction, and can expand emitted light in the vertical direction. Such structural design enables an imaging magnification power of the light incident portion 1 to the light source in the horizontal direction to be greater than an imaging magnification power of the light emergent portion 2 to the light source in the vertical direction, so that the light source can form an asymmetric light pattern by means of this lens unit, for example, a rectangular light pattern. The light emergent portion of the lens unit is allowed to have a dimension less than or equal to 20 mm in the up-down direction, so as to satisfy the requirement for the vehicle light in a narrow and long shape.

Figure 10:
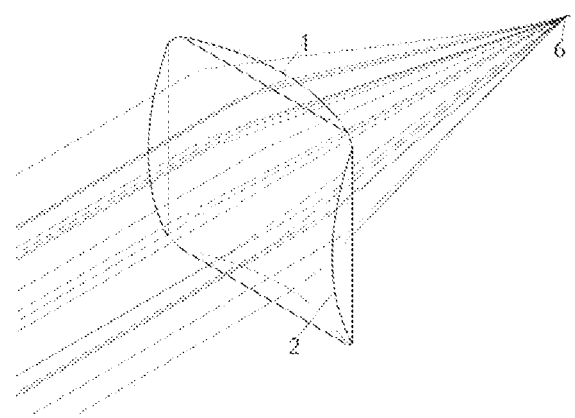
FIG. 10 is a schematic view of a stereoscopic light path of a lens unit in a fourth embodiment of the present disclosure.
Figure 11:
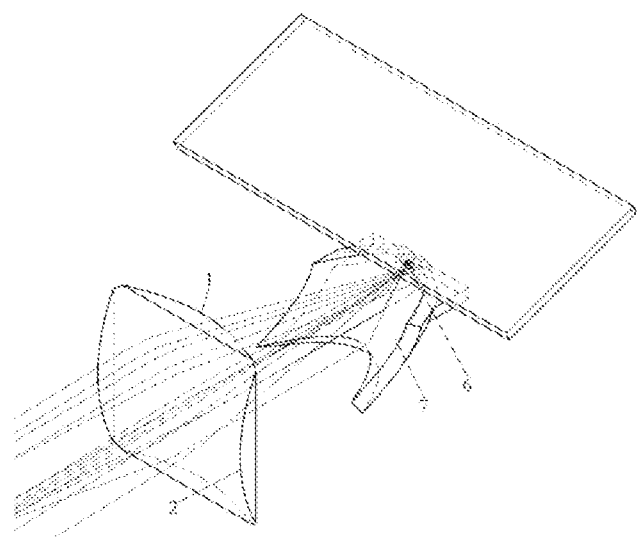
FIG. 11 is a schematic view of a stereoscopic light path of an illumination module in a fifth embodiment of the present disclosure, wherein the lens unit is the lens unit in the third embodiment.

Moreover, the asymmetry of the asymmetric light pattern formed by the above technical solution is caused by different focal lengths of the lens unit at two sides, wherein the asymmetric light pattern mainly refers to a rectangular light pattern, in other word, the asymmetric light pattern is related to a ratio of the magnification powers of the light incident portion 1 and the light emergent portion 2 to the light shape. The ratio of magnification powers depends on a distance between the light incident portion 1 and the light emergent portion 2. The larger the distance is, the larger the ratio is, and the more obvious the asymmetry is. Comparing what is shown in FIG. 1 and FIG. 10, the thickness of the lens unit can be reduced when the ratio is small.

Specifically, the light incident portion 1 can be regarded as a curved surface formed by stretching a section line thereof in a horizontal direction along a section line thereof in a vertical direction, for example, referring to FIG. 6, the section line of the light incident portion 1 in the horizontal direction is a backward convex curve, a section line thereof in the vertical direction is a straight line, and the light incident portion 1 is formed just by stretching the backward convex curve along this straight line; by the same reasoning, the light emergent portion 2 can be regarded as a curved surface formed by stretching a section line thereof in a vertical direction along a section line thereof in a horizontal direction, for example, with reference to FIG. 7, the section line of the light emergent portion 2 in the vertical direction is a forward convex curve, the section line thereof in the horizontal direction is a straight line, and the light emergent portion 2 is formed by stretching the forward convex curve along this straight line. The above-mentioned "forward convex" and "backward convex" are based on the fact that the curve is concave or convex with respect to a lens body.

Further, one of the light incident portion 1 and the light emergent portion 2 is a columnar surface, the other is a quasi-columnar surface, or both are columnar surfaces or quasi-columnar surfaces. The columnar surface can be understood as the following optical curved surface: taking the light incident portion 1 as an example, referring to FIG. 6, in a horizontal section, the section line of the light incident portion 1 in the horizontal direction is a convex curve, which has a converging effect, deflects the light to a larger degree, and can have a certain effect of collimating the divergent light. With reference to FIG. 7, in the vertical section, a section line of the light incident portion 1 in the vertical direction is a straight line or almost a straight line, so that deflecting ability of the light incident portion 1 to the divergent light is much inferior to that of the light incident portion 1 to the divergent light in the horizontal section, without a collimating effect, and the light incident portion 1 has the collimating effect on the divergent light in a single direction within a range of position of the horizontal section, that is, the light incident portion 1 mainly deflects the light in the horizontal direction; in the above, the columnar surface formed by the light incident portion 1 has a section line in the horizontal direction preferably in a circular arc shape. Of course, the section line of the light incident portion 1 in the horizontal direction is not necessarily in a circular arc shape, for example, forming a quasi-columnar surface. The "quasi-columnar surface" refers to a curved surface close to a columnar surface in shape, and also has a technical effect similar to that of the above columnar surface. By the same reasoning, it is also applicable to a columnar surface structure or a quasi-columnar surface structure formed by the light emergent portion 2. With reference to FIG. 7, in the vertical section, a section line of the light emergent portion 2 in the up-down direction is a convex curved line, which has a converging effect, deflects the light to a greater degree, and can have a certain effect of collimating the divergent light. With reference to FIG. 6, in the horizontal section, a section line of the light emergent portion 2 in the horizontal direction is a straight line or almost a straight line, so that deflecting ability of the light emergent portion 2 to the divergent light is much inferior to that of the light emergent portion 2 to the divergent light in the vertical section, without a collimating effect, and the light emergent portion 2 has the collimating effect in a single direction on the light within a range of position of the vertical section, that is, the light emergent portion 2 mainly deflects the light in the vertical direction. In the above, the columnar surface formed by the light emergent portion 2 has a section line in the horizontal direction preferably in a circular arc shape. Of course, the section line of the light emergent portion 2 in the vertical direction is not necessarily in a circular arc shape.

Figure 12:
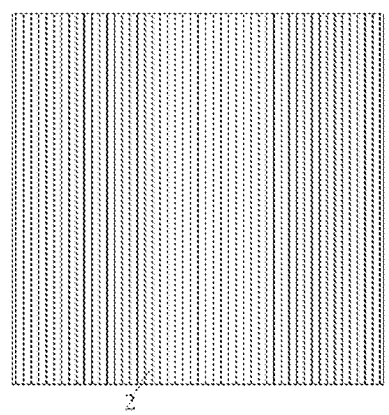
FIG. 12 is a front view of a lens unit in a sixth embodiment of the present disclosure.
Figure 13:
FIG. 13 is a left view of a lens unit in the sixth embodiment of the present disclosure.
Figure 14:
FIG. 14 is a bottom view of the lens unit in the sixth embodiment of the present disclosure.

As shown in FIG. 12 to FIG. 14, the light incident portion 1 and the light emergent portion 2 also may have a stepped Fresnel columnar surface. The "stepped Fresnel columnar surface" is realized in a manner of stretching Fresnel type curve, and has an effect of collimating light in a single direction. The "Fresnel type curve" refers to a curve in a shape which is the same as or similar to that of an intersecting line of a plane passing through an optical axis of a Fresnel lens and a surface of the Fresnel lens having a plurality of concentric circles. Like the above columnar surface structure, the stepped Fresnel columnar surface structure also can collimate light, and the stepped Fresnel columnar surface formed by the light incident portion 1 and the stepped Fresnel columnar surface formed by the light emergent portion 2 are arranged in a manner of being perpendicular to each other, and can also form an asymmetric light pattern.

The two technical solutions in which the light incident portion 1 and the light emergent portion 2 use the columnar surfaces or the stepped Fresnel columnar surfaces have been described in the above, respectively. It could be understood that the light incident portion 1 and the light emergent portion 2 can be simply modified, for example, the light incident portion 1 is a columnar surface and the light emergent portion 2 is a stepped Fresnel columnar surface, alternatively, the light incident portion 1 is a stepped Fresnel columnar surface and the light emergent portion 2 is a columnar surface, and light collimating directions of them are perpendicular to each other.

It could be understood that the optical lens of the present disclosure is described above by taking the case that the collimating orientation of the light incident portion 1 is in the horizontal direction and the collimating orientation of the light emergent portion 2 is in the vertical direction as an example. However, various embodiments are also applicable to the case that the collimating orientation of the light incident portion 1 is in the vertical direction and the collimating orientation of the light emergent portion 2 is in the horizontal direction. For example, in the embodiment of FIG. 1, viewing from arrangement orientation of the optical lens in FIG. 1, the collimating orientation of the columnar surface on the light incident portion 1 is in the vertical direction, and the collimating orientation of the columnar surface of the light emergent portion 2 is in the horizontal direction. Certainly, in order to enable the vehicle light to have an appearance in a narrow and long shape, in practical application, the collimating orientation of the light emergent portion 2 is usually defined in the vertical direction.

Figure 44:
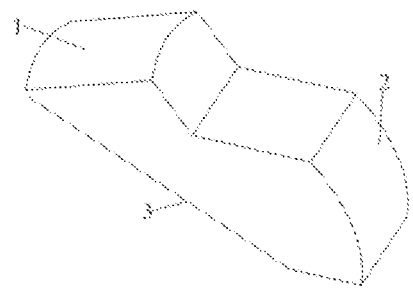
FIG. 44 is a perspective structural schematic view of a lens unit in a $14^{th}$ embodiment of the present disclosure.

In addition, referring to FIG. 44, a reflection portion 3 also may be provided on the lens unit, and the manner of arranging the light incident portion 1 and the light emergent portion 2 along the front-rear direction is changed, so that the light incident from the light incident portion 1 can be reflected by the reflection portion 3 to the light emergent portion 2, thus reducing the dimension of the lens unit of the present disclosure in the front-rear direction.

In practical application, a light emergent direction of the light emergent portion 2 of the lens unit of the present embodiment faces forward, that is, the "second direction" is substantially the same as the vertical direction, the light emergent portion 2 has an optical characteristic of collimating divergent light in a single direction in the vertical direction, and the light incident direction of the light incident portion 1 of the lens unit of the present embodiment faces upward or downward. It should be noted that the orientation of the light incident direction of the light incident portion 1 of the lens unit of the present embodiment is not limited to the vertical direction, and also may have a certain included angle with the vertical direction depending on the light distribution requirement. By adjusting the reflection portion 3, the light incident from the light incident portion 1 is reflected by the reflection portion 3 toward the light emergent portion 2. Moreover, the light incident portion 1 of the lens unit of the present embodiment and the light incident portion 1 of the lens unit shown in FIG. 6 and FIG. 7, apart from the difference in the orientation of the light incident direction, both have the same optical effect, that is to say, the light incident portion 1 of the lens unit of the present embodiment is obtained by mirroring the light incident portion 1 of the lens unit shown in FIG. 6 and FIG. 7 with respect to the reflection portion 3, and the divergent light, after being collimated by the light incident portion 1 in the first direction, is reflected by the reflection portion 3 and then is emitted along the horizontal direction. A section line of the light incident portion 1 of the lens unit of the present embodiment in the first direction is a convex curve, which has a converging effect, deflects the light to a greater degree, and can have a certain collimating effect on divergent light, and in a vertical-direction section perpendicular to the first direction, a section line of the light incident portion 1 in this vertical direction is a straight line or almost a straight line, so that deflecting ability of the light incident portion 1 to the divergent light is much inferior to that of the light incident portion 1 to the divergent light in the first-direction section, without a collimating effect, and the light incident portion 1 has the collimating effect on the divergent light in a single direction within a range of position of the first-direction section, that is, the light incident portion 1 deflects the light mainly in the first direction. In this way, when the lens unit of the present disclosure is applied to a vehicle light, as the light incident portion 1 has the collimating effect on the divergent light in a single direction within a range of position of the first-direction section, and the light emergent portion 2 has the collimating effect on the light in a single direction within a range of position of the second-direction section, an imaging magnification power of the light incident portion 1 to the light source in the first direction is greater than an imaging magnification power of the light emergent portion 2 to the light source in the second direction, so that the light source is allowed to form a rectangular light pattern of lighting by means of this lens unit, meanwhile, the light emergent portion 2 of the lens unit is enabled to have a smaller dimension in the up-down direction, for example, the light emergent portion 2 of the lens unit has the up-down dimension of 15 mm and the left-right dimension of 60 mm.

Specifically, the lens unit is preferably in a bending structure. Referring to FIG. 44, the light incident portion 1, the reflection portion 3, and the light emergent portion 2 are connected in sequence to form the bending structure. In the above, the reflection portion 3 is obliquely arranged, so that the light incident portion 1 and the light emergent portion 2 are connected through the reflection portion 3 to present a bending shape, the dimension of the lens unit in the front-rear direction can be reduced, facilitating the miniaturization design and being conducive to the arrangement inside the vehicle light. It should be noted that the reflection portion 3 and the light incident portion 1 and/or the reflection portion 3 and the light emergent portion 2 do not have to be directly connected together as shown in FIG. 44, as long as the light incident from the light incident portion 1 can be reflected by the reflection portion 3 to the light emergent portion 2, and all of the three, i.e., the light incident portion 1, the reflection portion 3, and the light emergent portion 2 present a bending shape in spatial arrangement.

In the above, the light incident portion 1 can be regarded as a curved surface formed by stretching a section line of the light incident portion in the first direction along a section line of the light incident portion in a direction perpendicular to the first direction, for example, referring to FIG. 44, the section line of the light incident portion 1 in the first direction is an outer convex curve, and a section line of the light incident portion in a direction perpendicular to the first direction (front-rear direction shown in the drawing) is a straight line; by the same reasoning, the light emergent portion 2 can be regarded as a curved surface formed by stretching a section line of the light emergent portion in a second direction along a section line of the light emergent portion in a direction perpendicular to the second direction, i.e., a curved surface formed by stretching along the left-right direction. For example, with reference to FIG. 44, the section line of the light emergent portion 2 in the second direction is a forward convex curve, and the section line of the light emergent portion in the left-right direction is a straight line.

Further, referring to FIG. 16, FIG. 17, FIG. 32, FIG. 39, and FIG. 49, various lens units can be linearly arranged along the left-right direction to form an optical lens, and various light emergent portions 2 are connected to form a light emergent surface 4. Certainly, the arrangement of various lens units is not limited to the linear arrangement, for example, in the front-rear direction, various lens units are arranged in a staggered manner to form a curved structure, and the lens unit located in the middle is located forward or backward with respect to the lens units located on two sides, to form nonlinear distribution protruding forward or backward, so that the light emergent surface 4 thereof forms a curved surface, preferably a smooth curved surface.

In an embodiment, the light incident portion 1 can be provided with an III region forming structure 5, and the number of III region forming structures 5 can be designed as required, for example, one, two or more. The III region forming structure 5 is provided or integrally formed on one light incident portion 1 or more light incident portions 1. The III region forming structure 5 is configured to form an important part, called as "III region", in a low-beam light pattern. The III region is located above a low-beam cut-off line, and light projected to this region mainly plays a role in lighting an object such as a signboard located above a road surface, so that the driver acquires information such as the signboard.

Figure 40:
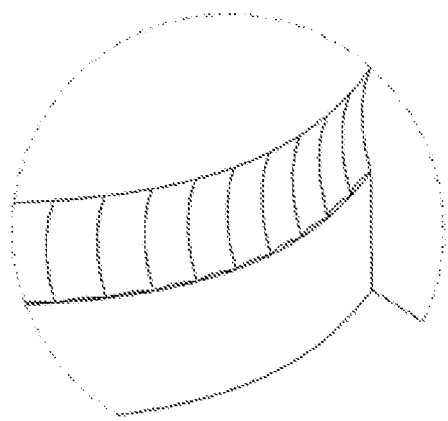
FIG. 40 is a partially enlarged view of a part F in FIG. 39.

With reference to FIG. 40, the III region forming structure 5 is a groove formed by recessing towards the interior of the optical lens, a length direction of the groove is arranged along the horizontal direction, and a section line of the groove in a front-rear direction is in an arc shape, so that light striking the III region forming structure 5 can be diffused along a height direction of a vehicle body; in addition, the lens forming a low-beam III region light pattern has a simple structure and does not occupy space outside the optical lens, so that the optical lens forming the low-beam III region light pattern can avoid interference between the III region forming structure 5 and other parts in the case where the positions and the number of various parts in the vehicle light continuously change, thus improving the flexibility of arrangement of parts inside the vehicle light and optical stability. Preferably, in a specific implementation process, the III region forming structure 5 is integrally formed on the light incident portion 1, and this implementation method can make the overall structure more firm and less susceptible to damage and have a longer service lifetime.

Figure 41:
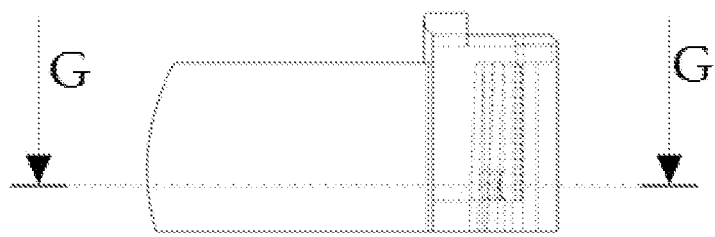
FIG. 41 is a structural schematic view of the optical lens in the $13^{th}$ embodiment of the present disclosure.
Figure 42:
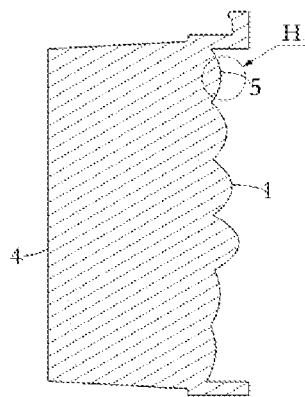
FIG. 42 is a sectional view in a G-G direction in FIG. 41.
Figure 43:
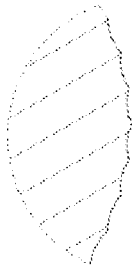
FIG. 43 is a partially enlarged view of a part H in FIG. 42.

Referring to FIG. 41 to FIG. 43, as a specific implementation structure of the III region forming structure 5, a plurality of strip-shaped protrusions and/or strip-shaped depressions extending along a width direction (an up-down direction) of the groove are sequentially provided or integrally formed in the groove along a length direction of the groove, wherein "facing the inside of the optical lens" is "depressing", and "facing the outside of the optical lens" is "protruding"; the strip-shaped protrusions and the strip-shaped depressions can diffuse light towards the width direction of the vehicle body, so that the formed low-beam III region light pattern has a larger width, the light pattern is more uniform, and the light pattern illuminance can be reduced within a range legally required, and a wider lighting range can be provided for the drivers, which is more favorable for the drivers to see signboards on two sides of road surface; furthermore, the integrally formed design makes the III region forming structure 5 less susceptible to damage and have a longer service lifetime than other manufacturing methods.

Figure 15:
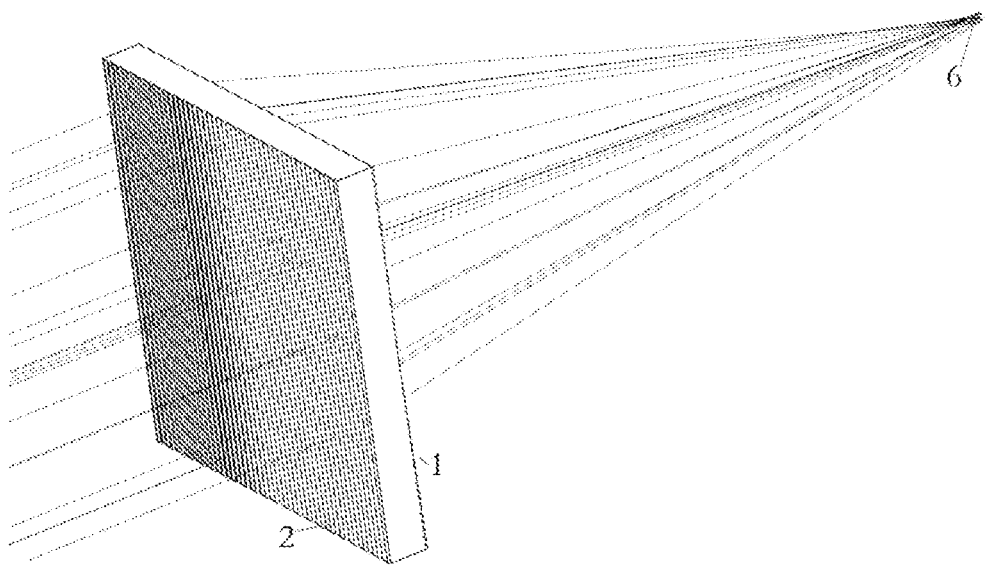
FIG. 15 is a schematic view of a stereoscopic light path of a lens unit in a seventh embodiment of the present disclosure.

Referring to FIG. 1, FIG. 10, and FIG. 15, an illumination module can be formed by combining the optical lens of the present disclosure with a light source 6. The optical lens can be directly used as a primary optical element, so that each light source 6 is arranged corresponding to each light incident portion 1. Specifically, the light source 6 is provided near a focal point or in a focal region of the optical lens. Alternatively, referring to FIG. 16 and FIG. 53, the optical lens of the present disclosure also may serve as a secondary optical element, and a primary optical element 7 focuses light emitted by the light source 6 to the focal point or the focal region of the optical lens, and then emits the light into the optical lens.

Figure 9:
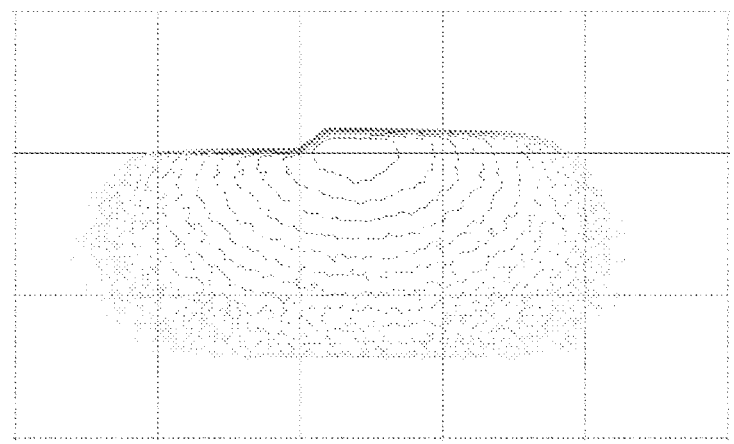
FIG. 9 is an effect schematic view of a light pattern of the illumination module in the third embodiment of the present disclosure, wherein the lens unit is the lens unit in the first embodiment.

It could be understood that the optical lens of the present disclosure may be formed by one lens unit, so as to form the illumination module as shown in FIG. 1, FIG. 8, FIG. 10, FIG. 11, FIG. 15, FIG. 45 or FIG. 48. For example, in the embodiment of FIG. 8, a low-beam cut-off structure is provided on the primary optical element 7, so that a low-beam light pattern as shown in FIG. 9 can be formed.

Figure 16:
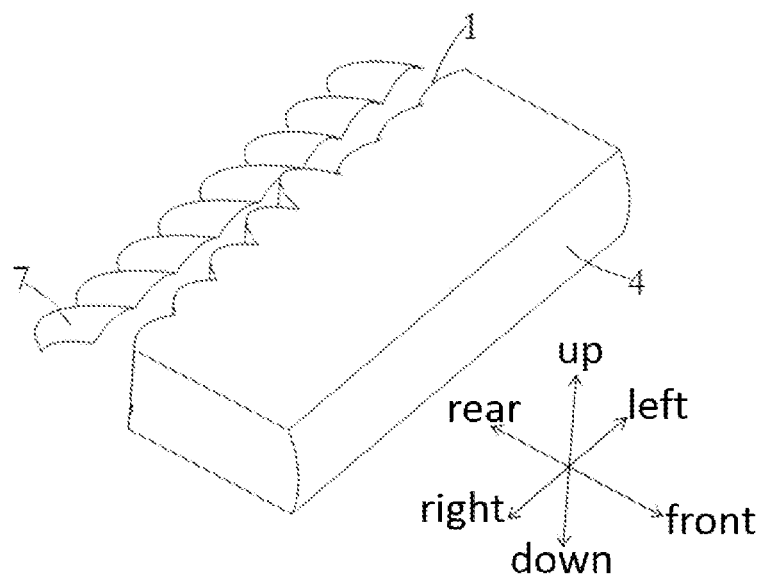
FIG. 16 is a first perspective structural schematic view of an illumination module in an eighth embodiment of the present disclosure.
Figure 17:
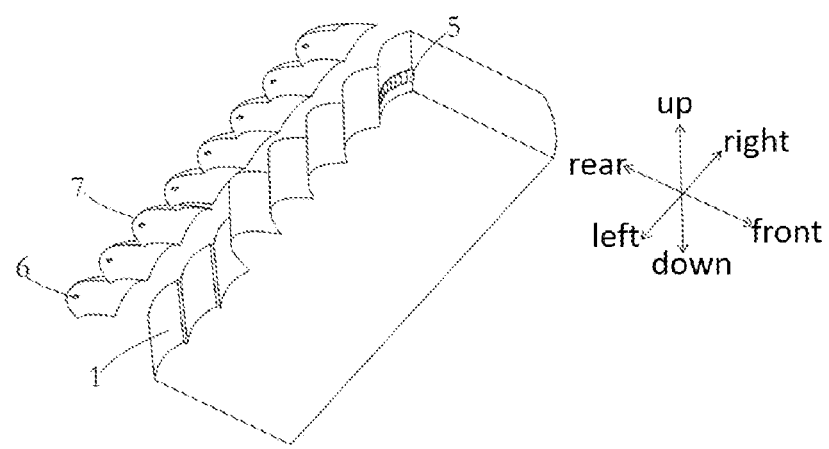
FIG. 17 is a second perspective structural schematic view of the illumination module in the eighth embodiment of the present disclosure.

As an embodiment of the illumination module, with reference to FIG. 16 and FIG. 17, each light source 6 and each primary optical element 7 are arranged in one-to-one correspondence, the light source 6 is arranged at a focal point or a region near the focal point of the corresponding primary optical element 7, and each primary optical element 7 may be arranged in one-to-one correspondence with each light incident portion 1, so that the primary optical element 7 can converge the light emitted from the light source 6 and project the same to the corresponding light incident portion 1, and then the light is re-directed into the optical lens. In the above, the primary optical element 7 may be an optical element such as a reflecting mirror, a condenser or a condensing cup.

Figure 20:
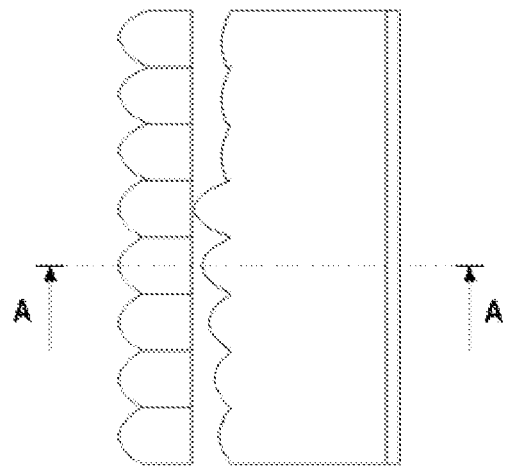
FIG. 20 is a structural schematic view of the illumination module in the eighth embodiment of the present disclosure.
Figure 21:
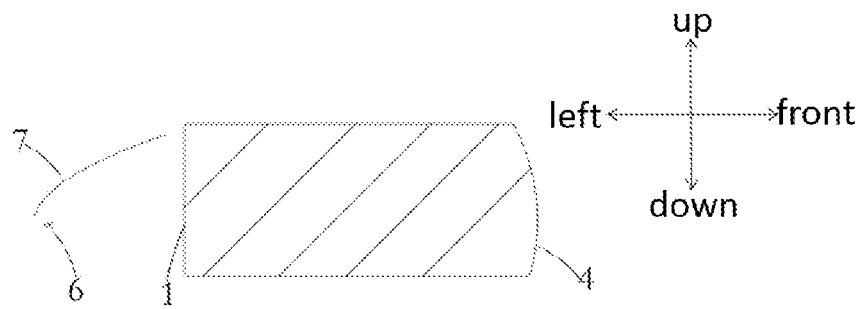
FIG. 21 is a sectional view in an A-A direction in FIG. 20.

Preferably, the primary optical element 7 may be a reflecting mirror. Referring to FIG. 20 and FIG. 21, the reflecting mirror is a parabolic reflecting mirror or a quasi-parabolic reflecting mirror, and a boundary of the reflecting mirror on a side close to the corresponding light source 6 is provided with a low-beam cut-off structure.

Figure 18:
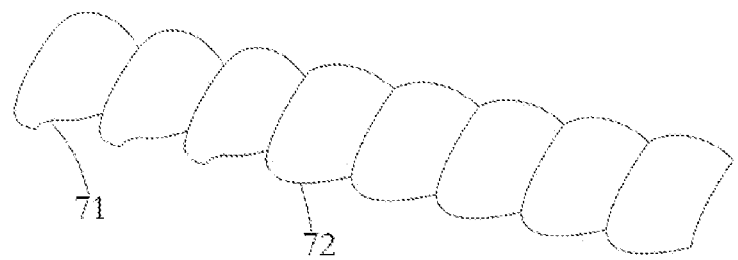
FIG. 18 is a perspective structural schematic view of a reflecting mirror in the eighth embodiment of the present disclosure.
Figure 19:
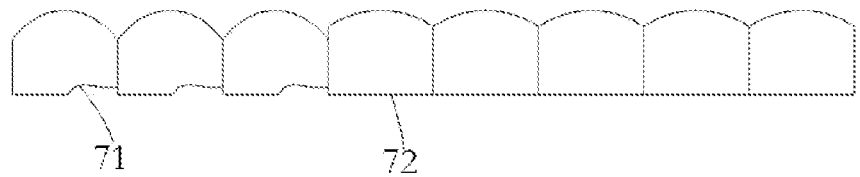
FIG. 19 is a rear schematic view of the reflecting mirror in the eighth embodiment of the present disclosure.
Figure 22:
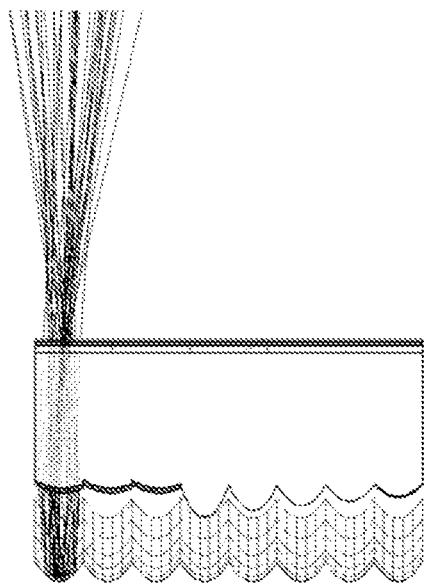
FIG. 22 is a schematic view of a light propagating direction of primary low beam in the eighth embodiment of the present disclosure.
Figure 23:
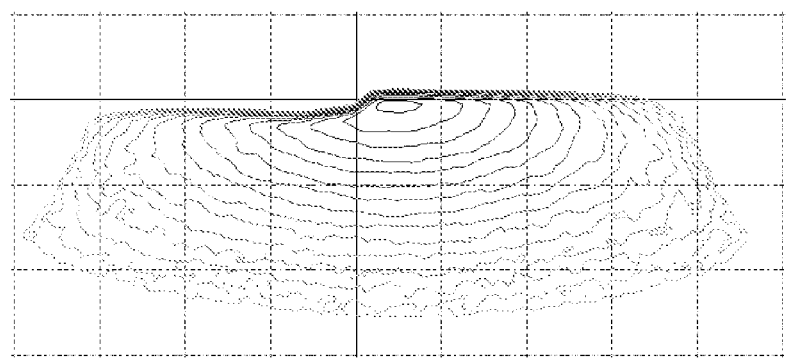
FIG. 23 is a schematic view of a light pattern of the primary low beam in the eighth embodiment of the present disclosure.
Figure 24:
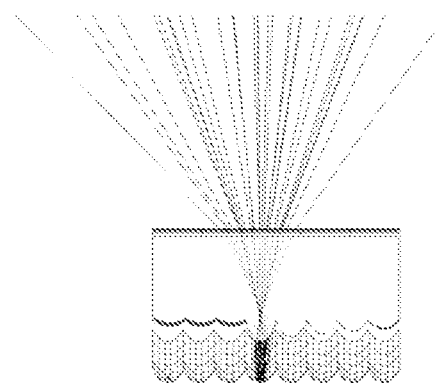
FIG. 24 is a schematic view of a light propagating direction of auxiliary low beam in the eighth embodiment of the present disclosure.
Figure 25:
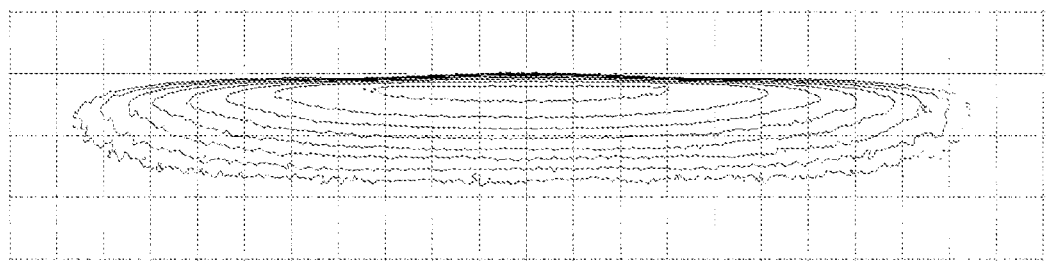
FIG. 25 is a schematic view of a light pattern of the auxiliary low beam in the eighth embodiment of the present disclosure.
Figure 26:
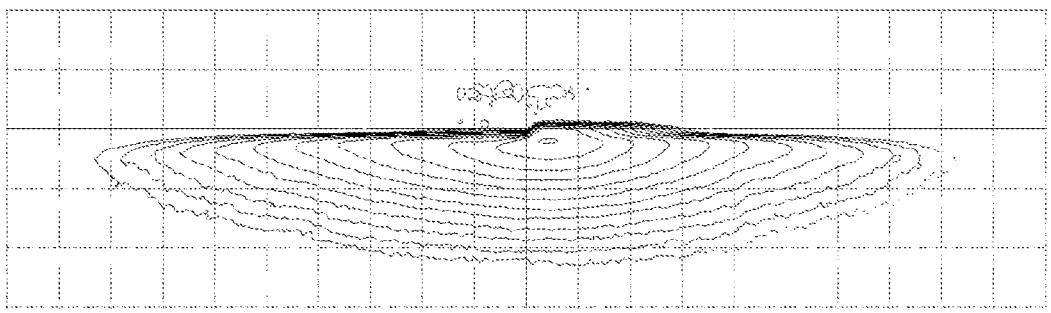
FIG. 26 is a schematic view of a light pattern of complete low beam in the eighth embodiment of the present disclosure.

With reference to FIG. 18 and FIG. 19, the low-beam cut-off structure includes a main low-beam cut-off line structure 71 and an auxiliary low-beam cut-off line structure 72, wherein the main low-beam cut-off line structure 71 is configured to form a part of the low-beam light pattern having an inflection point (knee-point) cut-off line in the low-beam light pattern as shown in FIG. 23, and for the convenience of description, it can be simply referred to as a main low-beam light pattern and is a central-region light pattern of the low-beam light pattern; the auxiliary low-beam cut-off line structure 72 is configured to form a part of the low-beam light pattern having a horizontal cut-off line as shown in FIG. 25 in the low-beam light pattern, and for the convenience of description, it can be simply referred to as an auxiliary low-beam light pattern, and can extend the broadening of the low-beam light pattern; for ease of description, taking two reflecting mirrors as an example, a boundary of one side of one reflecting mirror 4 close to the corresponding light source 6 forms the main low-beam cut-off line structure 71, and a boundary of the other reflecting mirror on one side close to the corresponding light source 6 forms the auxiliary low-beam cut-off line structure 72. Referring to FIG. 22, light emitted by one light source 6, after being reflected by the reflecting mirror having the main low-beam cut-line structure 71, enters the optical lens through the corresponding light incident portion 1, and then is projected to the front of the vehicle from the light emergent portion 2, to form the main low-beam light pattern having an inflection point cut-off line similar to that shown in FIG. 23 in the low-beam light pattern. Meanwhile, referring to FIG. 24, light emitted from the other light source 6, after being reflected by the reflecting mirror having the auxiliary low-beam cut-off line structure 72, enters the optical lens through the corresponding light incident portion 1, and then is projected to the front of the vehicle from the light emergent portion 2, so as to form the auxiliary low-beam light pattern having a horizontal cut-off line similar to that shown in FIG. 25 in the low-beam light pattern. Curvature of the light incident portion 1 corresponding to the auxiliary low-beam cut-off line structure 72 is larger than that of the light incident portion 1 corresponding to the main low-beam cut-off line structure 71, so that the light emitted by the light emergent portion 2 is diffused at a larger angle at left and right, thus extending the broadening of the light pattern. The two light patterns are superimposed to form a complete low-beam light pattern similar to that shown in FIG. 26; respective numbers of reflecting mirrors having the main low-beam cut-off line structure 71 and reflecting mirrors having the auxiliary low-beam cut-off line structure 72 can be set according to needs; certainly, it is also possible that only a reflecting mirror having the main low-beam cut-off line structure 71 is provided, and in combination with an existing vehicle light module, the auxiliary low-beam light pattern in the low-beam light pattern is formed by the existing vehicle light module, such that the broadening of the low-beam light pattern is expanded; alternatively, it is also possible that only a reflecting mirror having an auxiliary low-beam cut-off line structure 72 is provided, and in combination with an existing vehicle light module, the main low-beam light pattern in the low-beam light pattern is formed by the existing vehicle light module, so as to obtain a complete low-beam light pattern.

Correspondingly, the light incident portion 1 may be divided into a main low-beam light incident portion 11 and an auxiliary low-beam light incident portion 12, the main low-beam light incident portion 11 is provided corresponding to the main low-beam cut-off line structure 71, and the auxiliary low-beam light incident portion 12 is provided corresponding to the auxiliary low-beam cut-off line structure 72; further, an included angle between a section line of the main low-beam light incident portion 11 in a direction perpendicular to the first direction and a section line of the auxiliary low-beam light incident portion 12 in the direction perpendicular to the first direction is 0.2° ~1°.

Figure 29:
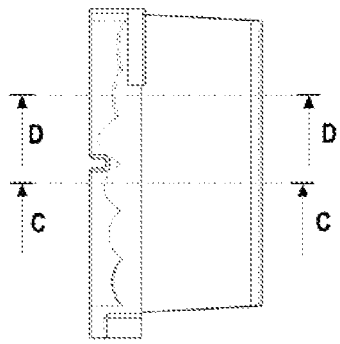
FIG. 29 is a structural schematic view of an optical lens in a tenth embodiment of the present disclosure.
Figure 30:
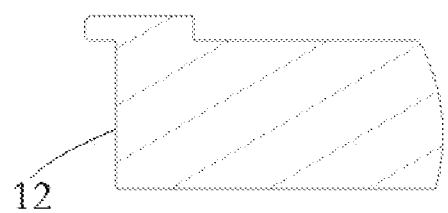
FIG. 30 is a sectional view in a C-C direction in FIG. 29.
Figure 31:
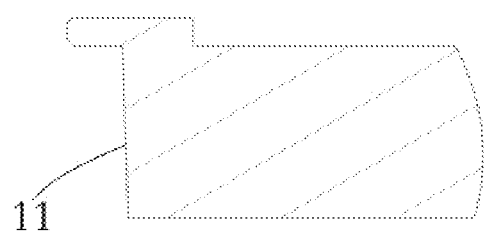
FIG. 31 is a sectional view in a D-D direction in FIG. 29.
Figure 32:
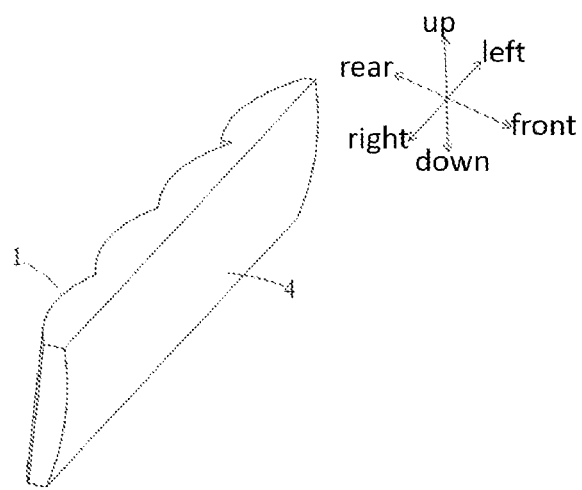
FIG. 32 is a structural schematic view of an optical lens in an $11^{th}$ embodiment of the present disclosure.
Figure 33:
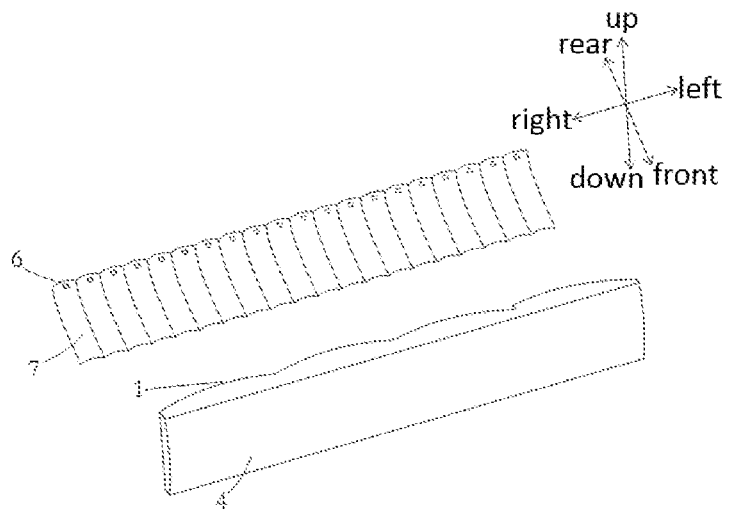
FIG. 33 is a perspective structural schematic view of an illumination module in a $12^{th}$ embodiment of the present disclosure.
Figure 34:
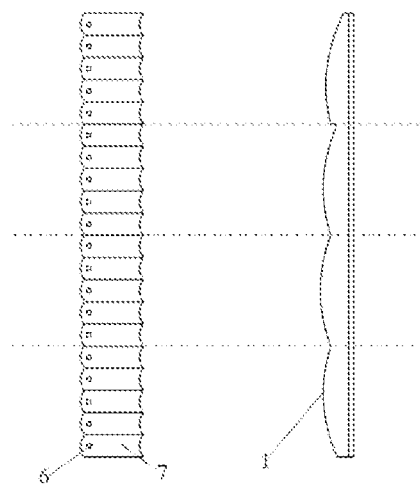
FIG. 34 is a first structural schematic view of the illumination module in the $12^{th}$ embodiment of the present disclosure.
Figure 35:
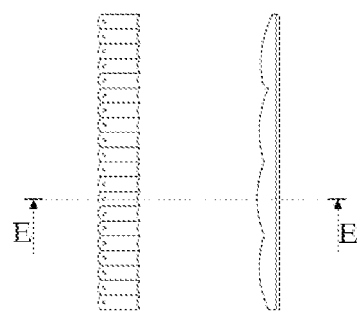
FIG. 35 is a second structural schematic view of the illumination module in the $12^{th}$ embodiment of the present disclosure.
Figure 36:
FIG. 36 is a sectional view in an E-E direction in FIG. 35.

Specifically, in the embodiment shown in FIG. 29 to FIG. 31, the first direction is the horizontal direction, and a section line of the main low-beam light incident portion 11 in the vertical direction and a section line of the auxiliary low-beam light incident portion 12 in the vertical direction have an included angle therebetween, and the included angle is in a range of 0.2°~1°, so that the incident light of the main low beam light incident portion 11, after being refracted by the light emergent portion 2, can be deflected upwards, so that the light of the main low beam is closer to the inflection point cut-off line, the quantity of light near the inflection point cut-off line is increased, and the low-beam lighting effect is improved, so that the low-beam visibility is better. For example, the section line of the auxiliary low-beam light incident portion 12 in the vertical direction extends along the vertical direction, and the section line of the main low-beam light incident portion 11 in the vertical direction is inclined by 0.2°~1° with respect to the vertical direction.

In an embodiment, the main low-beam cut-off line structure 71 is a bending line (broken line) segment formed by connecting straight line segments and/or curved line segments having a segment difference, that is, the bending line segment may include two straight line segments having a segment difference, also may include two curved line segments having a segment difference, or also may include one straight line segment and one curved line segment having a segment difference. The auxiliary low-beam cut-off line structure 72 is a straight line segment or a curved line segment, i.e., a straight line segment or a curved line segment without a segment difference.

It can be understood that the illumination module of the present disclosure also can be applied to a high-beam illumination module, the reflecting mirror does not need to be provided thereon with a cut-off structure, the focal point of the optical lens can be provided on a reflection surface of the reflecting mirror, light emitted by the light source 6 is reflected by the reflecting mirror to the light incident portion 1 of the optical lens, and is emitted from the light emergent portion 2, to form an elongated high-beam light pattern; in addition, the illumination module of the present disclosure can also have both high beam and low beam functions, i.e., an illumination module with integrated high beam and low beam is formed. The relative positions of the light source 6 and the reflecting mirrors corresponding to one part of the light incident portions 1 of the optical lens of the present disclosure are shown in FIG. 21. A lower boundary of the reflecting mirror is provided with a low-beam cut-off structure, and the reflecting mirror corresponding to the other of the light incident portions 1 of the optical lens of the present disclosure does not need to be provided thereon with the cut-off structure. By controlling on and off of corresponding light sources 6, the high beam and low beam functions are achieved.

Figure 37:
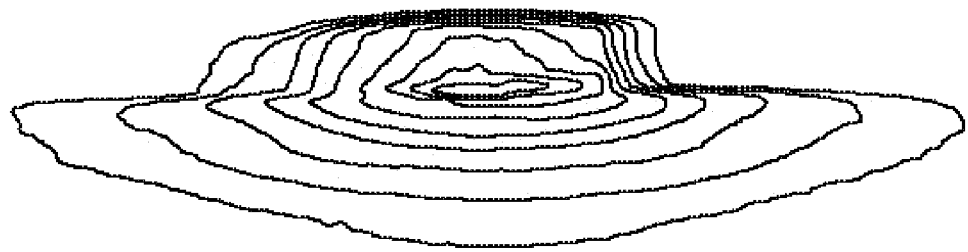
FIG. 37 is a first schematic view of a light pattern of high beam in the $12^{th}$ embodiment of the present disclosure.
Figure 38:
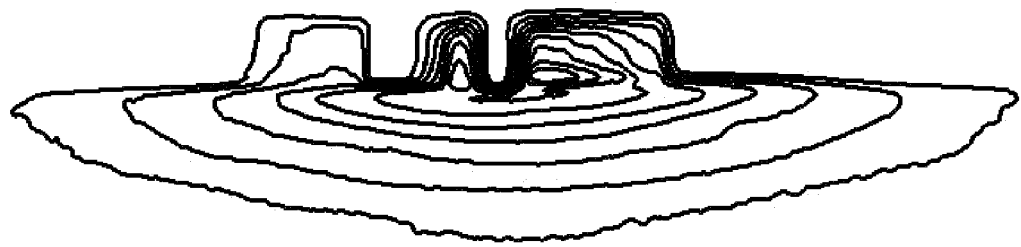
FIG. 38 is a second schematic view of the light pattern of the high beam in the $12^{th}$ embodiment of the present disclosure.
Figure 39:
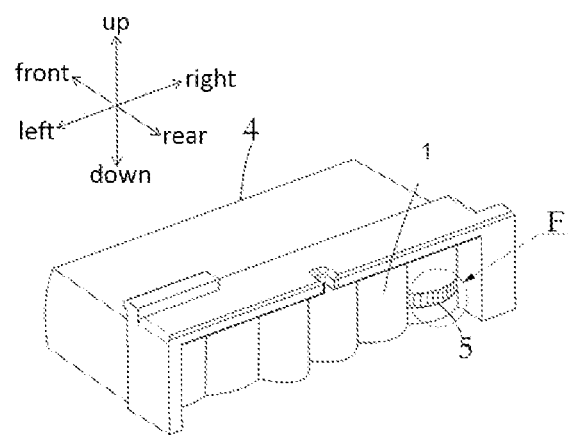
FIG. 39 is a perspective structural schematic view of an optical lens in a $13^{th}$ embodiment of the present disclosure.

In an embodiment, referring to FIG. 33 to FIG. 36, each light incident portion 1 may be provided corresponding to a plurality of reflecting mirrors respectively, to form a high-beam illumination module. Such structural design enables the vehicle light to implement an ADB self-adaptive high-beam function. For example, the high-beam illumination module of the present disclosure is applied to a specific vehicle, various reflecting mirrors are connected and arranged in a left-right direction, and various light incident portions 1 are also connected and arranged along the left-right direction. By controlling turn-on and turn-off of each light source 6, when all the light sources 6 are in a turn-on state during night driving, the high-beam light pattern as shown in FIG. 37 can be formed. When other users of the road in opposite lane are detected, as shown in FIG. 38, each corresponding light source 6 can be controlled to be turned off, so that a dark region is formed in the high-beam light pattern region in a position corresponding to other detected users of the road, thus, avoiding dazzling to other users of the road, and preventing the occurrence of safety accident. For the configuration manner that each light incident portion 1 is corresponding to a plurality of reflecting mirrors, each reflecting mirror is corresponding to a light pattern of one region, and in conjunction with the control over each light source 6, a region corresponding to each reflecting mirror can form a dark region to realize an ADB self-adaptive high beam function; moreover, as the light incident portion 1 is configured to mainly deflect light in the horizontal direction, and the light emergent portion 2 is configured to mainly deflect light in the vertical direction, the imaging magnification power of the light incident portion 1 to the light source 6 in the horizontal direction is larger than the imaging magnification power of the light emergent portion 2 to the light source 6 in the vertical direction, thus, the light source 6 can form a rectangular light pattern of lighting through this optical lens, and meanwhile, compared with the above common spherical lens in the prior art, the present disclosure reduces the up-down dimension of the optical lens on the premise of ensuring the same light effect, i.e., being able to allow the up-down dimension of the light emergent portion 2 to be set in a range less than or equal to 20 mm, so as to obtain a narrow-and-long high-beam illumination module, and relatively high optical efficiency can also be obtained in the case where the up-down dimension is limited. For example, when the up-down dimension of the light emergent portion 2 is designed as 15 mm, the optical efficiency can reach 44~50% (including external distribution loss). Such optical efficiency is equivalent to that when the lens in the prior art is made to open by 30 mm or more (particularly, 40 mm or more).

Figure 47:
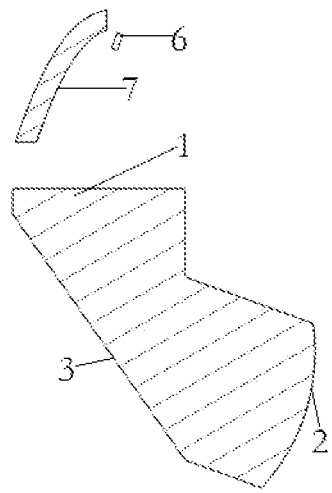
FIG. 47 is a sectional view in an I-I direction in FIG. 46.

In an embodiment, referring to FIG. 45 to FIG. 47, and FIG. 49 to FIG. 52, the illumination module in the present embodiment is used for low beam lighting, including a primary optical element 7 and an optical lens. The optical lens includes a plurality of lens units connected along the left-right direction. The lens unit includes light incident portions 1 collimating light in a first single direction, reflection portions 3, and light emergent portions 2 collimating light in a second single direction, wherein various light emergent portions 2 are connected to form a light emergent surface 4, various reflection portions 3 are connected to form a reflection surface 30, and the light emitted by the light source 6, after being reflected by the corresponding primary optical element 7, enters the light incident portions 1 of the optical lens as substantially parallel light beams, and the reflection surface 30 is obliquely arranged, so that the optical lens is in a bending shape, which can reduce the dimension of the illumination module in the front-rear direction. Referring to FIG. 47, a low-beam cut-off structure can be provided at a front boundary of the primary optical element 7 (a boundary of the primary optical element 7 at a side close to the light source 6), or a light shading plate or other light shading elements having a low-beam cut-off structure is provided between the primary optical element 7 and the light incident portion 1 of the optical lens, thus realizing a low beam lighting function. An III region forming structure 5 further may be provided on one or more light incident portions 1, so as to be able to form a low-beam III region light pattern; alternatively, to be used for a vehicle lighting device such as a fog lamp or a corner lamp. In the above, the primary optical element 7 is preferably a parabolic reflecting mirror or a quasi-parabolic reflecting mirror.

Figure 45:
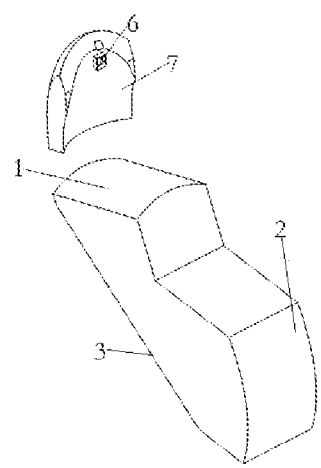
FIG. 45 is a perspective structural schematic view of an illumination module in a 15th embodiment of the present disclosure.
Figure 46:
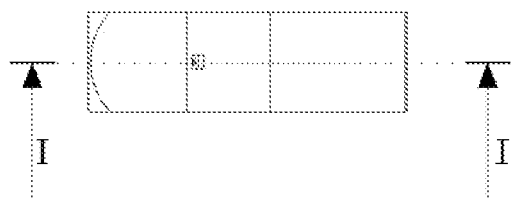
FIG. 46 is a structural schematic view of the illumination module in the 15th embodiment of the present disclosure.
Figure 48:
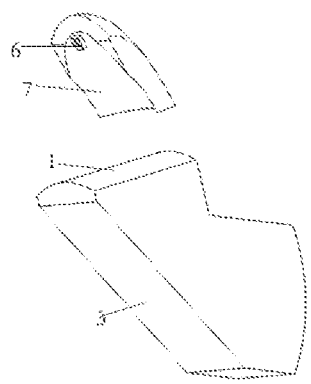
FIG. 48 is a perspective structural schematic view of an illumination module in a 16th embodiment of the present disclosure.

Certainly, the optical lens of the above embodiment also may be used for high beam lighting. FIG. 48 provides an embodiment for high beam lighting, which is different from the above optical module for low beam lighting mainly in that the cut-off structure and the III region forming structure 5 may not be provided. Alternatively, the optical lens of the present disclosure also may be applied to an illumination module with integrated high beam and low beam, and the relative positions of the primary optical element 7 corresponding to a part of the light incident portions 1 of the optical lens of the present disclosure and the light source 6 are set as shown in FIG. 45. A front boundary of the primary optical element 7 is provided with a low-beam cut-off structure, and the primary optical element 7 corresponding to the other part of the light incident portions 1 of the optical lens of the present disclosure is not provided with the cut-off structure, and its relative position with the light source 6 is as shown in FIG. 48. The high beam and low beam functions are realized by controlling on and off of the corresponding light source 6.

Figure 53:
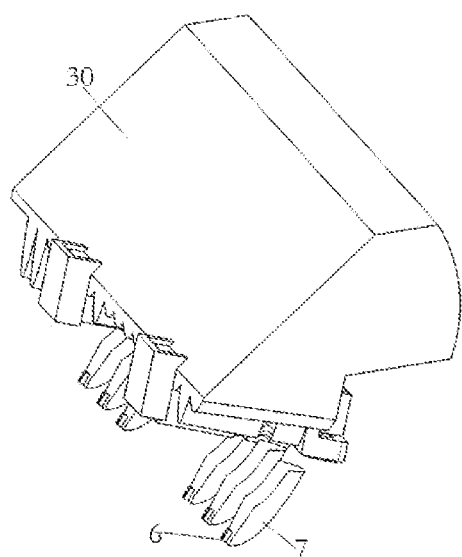
FIG. 53 is a perspective structural schematic view of an illumination module in an 18th embodiment of the present disclosure.

It could be understood that, the optical lens is in a bending shape, and can be arranged in a manner of bending upward as shown in FIG. 44 to FIG. 49 or can be arranged in a manner of bending downward as shown in FIG. 53 when being installed in a specific illumination module. The arrangement manner is specifically selected according to actual installation conditions.

Figure 49:
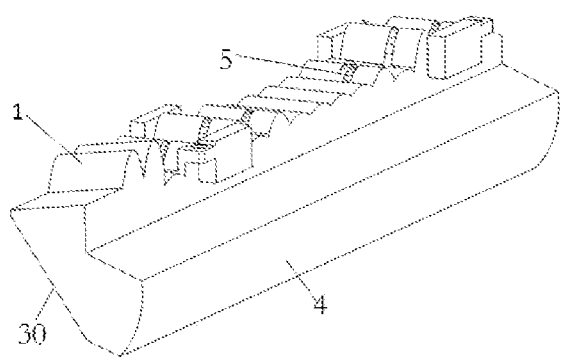
FIG. 49 is a perspective structural schematic view of an optical lens in a 17th embodiment of the present disclosure.
Figure 50:
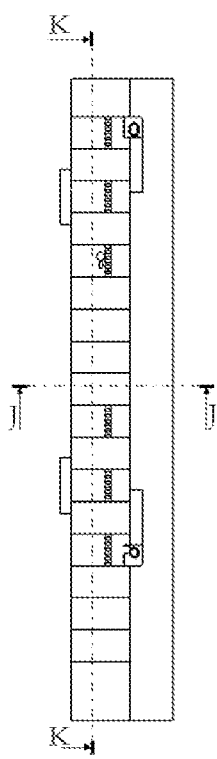
FIG. 50 is a structural schematic view of an optical lens in the 17th embodiment of the present disclosure.
Figure 51:
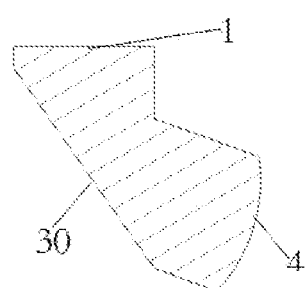
FIG. 51 is a sectional view in a J-J direction in FIG. 50.
Figure 52:
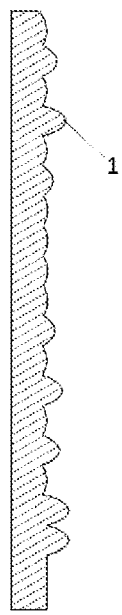
FIG. 52 is a sectional view in a K-K direction in FIG. 50.

It should be noted that, FIG. 49 and FIG. 50 provide a specific structural form of the optical lens, various reflection portions 3 are connected to form the reflection surface 30, and various light incident portions 1 are connected in sequence along the left-right direction. Certainly, the optical lens also may be in other specific structural forms, for example, gaps are formed between various lens units, that is, various light incident portions 1 are arranged at intervals along the left-right direction, and wedge-shaped gaps are also formed between various reflection portions 3. Each wedge-shaped gap is gradually reduced in a direction from the light incident portion 1 to the light emergent surface 4, so that light in various light incident portions 1 does not enter other light incident portions, ensuring independence of lighting regions corresponding to various light incident portions 1 and light effect of various lighting regions.

In the present disclosure, by specially designing the optical lens, the light incident portion 1 thereof has the optical characteristic of collimating light unidirectionally in the first direction, and the light emergent portion 2 thereof has an optical characteristic of collimating light unidirectionally in the second direction. It should be noted that the "collimating light in a first single direction" can be understood as follows: in the first-direction section, the section line of the light incident portion 1 in the first direction is a convex curve, which has the converging effect, deflects the light to a greater degree, and can have a certain collimating effect on divergent light. In the vertical-direction section perpendicular to the first direction, the section line of the light incident portion 1 in this vertical direction is a straight line or almost a straight line, so that the deflecting ability of the light incident portion 1 to the divergent light is much inferior to that of the light incident portion 1 to the divergent light in the first-direction section, without a collimating effect, and the light incident portion 1 has the collimating effect on the divergent light in a single direction within a range of position of the first-direction section, that is, the light incident portion 1 deflects the light mainly in the first direction. By the same reasoning, the "collimating light in a second single direction" can be understood as follows: in the second-direction section, the section line of the light emergent portion 2 in the second direction is a convex curve, which has a converging effect, deflects the light to a greater degree, and can have a certain collimating effect on divergent light; in the vertical-direction section perpendicular to the second direction, the section line of the light emergent portion 2 in this vertical direction is a straight line or almost a straight line, so that the deflecting ability of the light emergent portion 2 to the divergent light is much inferior to that of the light emergent portion 2 to the divergent light in the second-direction section, without a collimating effect; and the light emergent portion 2 has the collimating effect in a single direction on the light within the range of position of the second-direction section, that is, the light emergent portion 2 deflects the light mainly in the second direction. In this way, when the optical lens of the present disclosure is applied to a vehicle light (in practical application, the up-down direction of the light emergent portion 2 is substantially the same as the up-down direction of the vehicle light). As the light incident portion 1 has the collimating effect on the divergent light in a single direction within a range of position of the first-direction section, and the light emergent portion 2 has the collimating effect on the light in a single direction within the range of position of the second-direction section, the imaging magnification power of the light incident portion 1 to the light source in the first direction is greater than the imaging magnification power of the light emergent portion 2 to the light source in the second direction, so that the light source 6 forms a rectangular light pattern of the lighting by means of this optical lens, meanwhile, the light emergent portion 2 of the optical lens can be allowed to have a relatively small dimension in the up-down direction, for example, the light emergent portion 2 of the lens unit has the up-down dimension of 15 mm and the left-right dimension of 60 mm. When the optical lens of the present disclosure is applied on a specific vehicle, the vehicle light of the vehicle can be made to have an appearance with a relatively small opening in the up-down direction, for example, a headlamp, conforming to the market trend that the vehicle light has a narrow and long shape.

In the above, the primary optical element 7 also may be other primary optical elements such as a condenser. The light source 6 may be a semiconductor light source, for example, an LED light source and a semiconductor laser light source. As a new source of energy, the LED light source has gradually replaced the conventional light sources. The LED light source not only is energy-saving and environmentally friendly, but also has a long service lifetime, high brightness, stable performance, and high lighting purity. Therefore, a vehicle lighting device with the LED light source as a design basis has a wide development prospect. For the semiconductor laser light source, due to its strong directivity and being not easy to diverge, it is easier to make light avoid parts which may interfere with it.

In general, a light-emitting center of the light source 6 is provided in a focal region of the corresponding primary optical element 7, wherein the focal region is a region near the focal point including the focal point. Specifically, the light-emitting center of the light source 6 may be provided on the focal point of the primary optical element 7, and according to the requirements of light distribution, the light-emitting center of the light source 6 also may be deviated from the above focal point by a certain distance, for example, a distance between the light-emitting center of the light source 6 and the focal point of the primary optical element 7 is less than or equal to 2 mm. In the above, the primary optical element 7 is preferably a reflecting mirror, and the reflecting mirror may be a parabolic reflecting mirror or a quasi-parabolic reflecting mirror.

In addition, the illumination module of the present disclosure also can be installed in a vehicle light, so that the vehicle light has an appearance with an opening having an up-down dimension of less than or equal to 20 mm, for example, the up-down dimension of the light emergent surface 2 is designed to be 15 mm, and the optical efficiency can reach 44~50% (including external distribution loss). Such optical efficiency is equivalent to that when the lens in the prior art is made to open by 30 mm or more (particularly, 40 mm or more). Further, the above vehicle light is applied to a specific vehicle, to satisfy the market requirement for vehicles with a vehicle light in a narrow and long shape, meanwhile without affecting aspects such as light pattern, optical performance, and optical efficiency. Moreover, the design of bending structure of the optical lens of the present disclosure reduces the dimension of the illumination module in the front-rear direction, facilitates the miniaturization of the vehicle light, and facilitates the arrangement and design of the vehicle light in the vehicle.

Figure 27:
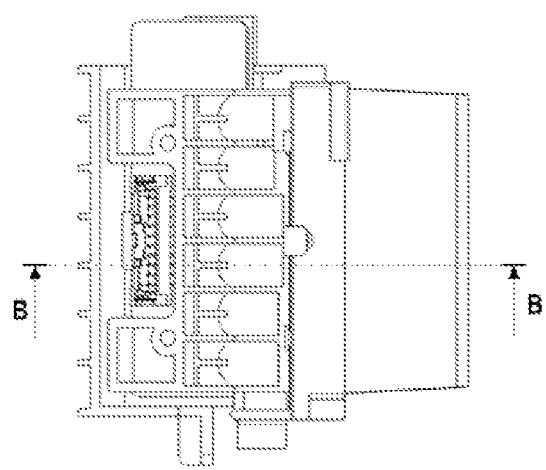
FIG. 27 is a structural schematic view of a vehicle light in a ninth embodiment of the present disclosure.

The illumination module of the present disclosure is installed in a vehicle light, and generally, referring to FIG. 27 and FIG. 28, the light source 6 is installed on a circuit board 8. Specifically, the light source 6 is installed on an installation surface of the circuit board 8. In order to make more light enter the optical lens, the light source 6 rotates relative to the horizontal direction by a certain angle as shown in FIG. 28, where the angle is preferably greater than or equal to 5°, and 20° in the embodiment is shown in FIG. 28. That is to say, the included angle between the installation surface for installing the light source 1 on the circuit board 7 and the horizontal direction is greater than or equal to 5°. In addition, the circuit board 7 is also connected to the heat sink 8 so as to dissipate heat generated by the circuit board 7.

As the vehicle light of the present disclosure uses the above illumination module, by correspondingly designing the vehicle light, the vehicle light can have a flat and wide appearance, for example, the headlamp of the vehicle is allowed to present a narrow and long shape.

The vehicle of the present disclosure, by using the above vehicle light, at least has all the beneficial effects brought about by the technical solutions of the above vehicle light embodiments, which will not be repeated herein.

Preferred embodiments of the present disclosure are described in detail in the above with reference to the accompanying drawings, but the present disclosure is not limited thereto. Within the scope of the technical concept of the present disclosure, many simple modifications can be made to the technical solutions of the present disclosure, including combining various specific technical features in any suitable manners. In order to avoid unnecessary repetition, various possible combining manners are not described otherwise in the present disclosure. However, such simple modifications and combinations should also be considered as contents disclosed in the present disclosure, and all belong to the scope of protection of the present disclosure.

What is claimed is:

1. An illumination module, comprising an optical lens, wherein the optical lens comprises a plurality of lens units, wherein the lens units are arranged along a left-right direction and each comprise a light incident portion and light emergent portion, and individual light emergent portions are connected to form a light emergent surface, and a plurality of light sources, wherein the light sources are arranged corresponding to light incident portions, so that light emitted from the light sources can enter the optical lens through corresponding light incident portions;

the illumination module further comprising a plurality of primary optical elements in one-to-one correspondence with the light sources, and the primary optical elements are arranged in a manner of being capable of converging and projecting light emitted by the light sources to the corresponding light incident portions, and directing the light into the optical lens;

wherein each of the primary optical elements is a reflecting mirror;

wherein the reflecting mirror is a parabolic reflecting mirror or a quasi-parabolic reflecting mirror, and a boundary of the reflecting mirror on a side closest to a corresponding light source is provided with a main low-beam cut-off line structure or an auxiliary low-beam cut-off line structure;

wherein the boundary of the plurality of reflecting mirrors on the side closest to the corresponding light sources is provided with the main low-beam cut-off line structure and the auxiliary low-beam cut-off line structure; and wherein a curvature of a light incident portion corresponding to the auxiliary low-beam cut-off line structure is larger than a curvature of a light incident portion corresponding to the main low-beam cut-off line structure.

2. The illumination module according to claim 1, wherein the main low-beam cut-off line structure is a bending line segment formed by connecting straight line segments and/or curved line segments having a segment difference, and the auxiliary low-beam cut-off line structure is a straight line segment or a curved line segment.

3. The illumination module according to claim 1, wherein an III region forming structure is provided or integrally formed on at least one light incident portion.

4. The illumination module according to claim 3, wherein the III region forming structure is a groove, and a plurality of strip-shaped protrusions and/or strip-shaped depressions extending along a width direction of the groove are sequentially provided or integrally formed in the groove along a length direction thereof.

5. An illumination module, comprising an optical lens, wherein the optical lens comprising a plurality of lens units, wherein the lens units are arranged along a left-right direction and each comprise a light incident portion and light emergent portion, and individual light emergent portions are connected to form a light emergent surface, and a plurality of light sources, wherein the light sources are arranged corresponding to light incident portions, so that light emitted from the light sources can enter the optical lens through corresponding light incident portions;

the illumination module further comprising a plurality of primary optical elements in one-to-one correspondence with the light sources, and the primary optical elements are arranged in a manner of being capable of converging and projecting light emitted by the light sources to the corresponding light incident portions, and directing the light into the optical lens;

wherein each of the primary optical elements is a reflecting mirror;

wherein each of the primary optical elements is provided with a main low-beam cut-off line structure or an auxiliary low-beam cut-off line structure; and the boundary of the plurality of reflecting mirrors on the side closest to the corresponding light sources is provided with the main low-beam cut-off line structure and the auxiliary low-beam cut-off line structure;

wherein a curvature of a light incident portion corresponding to the auxiliary low-beam cut-off line structure is larger than a curvature of a light incident portion corresponding to the main low-beam cut-off line structure; and wherein a lens unit of the plurality of lens unit comprises a light incident portion collimating light in a first single direction and a light emergent portion collimating light in a second single direction, so as to be capable of forming an asymmetric light pattern.

6. The illumination module according to claim 5, wherein the asymmetric light pattern is a rectangular light pattern.

7. The illumination module according to claim 5, wherein the light incident portion is a curved surface formed by stretching a section line thereof in a first direction along a section line thereof in a direction perpendicular to the first direction, and the light emergent portion is a curved surface formed by stretching a section line thereof in a second direction along a section line thereof in a direction perpendicular to the second direction.

8. The illumination module according to claim 7, wherein both the light incident portion and the light emergent portion are columnar surfaces or quasi-columnar surfaces.

9. The illumination module according to claim 8, wherein both the light incident portion and the light emergent portion are cylindrical surfaces.

10. The illumination module according to claim 7, wherein both the light incident portion and the light emergent portion are stepped Fresnel columnar surfaces.

11. The illumination module according to claim 7, wherein one of the light incident portion and the light emergent portion is a columnar surface, and the other is a stepped Fresnel columnar surface.

12. The illumination module according to claim 5, wherein one of a light collimating direction of the light incident portion and a light collimating direction of the light emergent portion is a vertical direction, and the other is a horizontal direction.

13. The illumination module according to claim 5, further comprising a reflection portion, wherein the reflection portion is arranged in a manner of being capable of reflecting light incident from the light incident portion to the light emergent portion.

14. The illumination module according to claim 13, wherein the light incident portion, the reflection portion, and the light emergent portion are connected in sequence to form a bending structure.

* * * * *